(12) United States Patent
Ryu et al.

(10) Patent No.: US 10,231,089 B2
(45) Date of Patent: Mar. 12, 2019

(54) METHOD FOR MANAGING AREA OF TERMINAL IN WIRELESS COMMUNICATION SYSTEM AND APPARATUS THEREFOR

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Taehun Kim, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/739,524

(22) PCT Filed: Jun. 23, 2016

(86) PCT No.: PCT/KR2016/006693
§ 371 (c)(1),
(2) Date: Dec. 22, 2017

(87) PCT Pub. No.: WO2016/208997
PCT Pub. Date: Dec. 29, 2016

(65) Prior Publication Data
US 2018/0184246 A1 Jun. 28, 2018

Related U.S. Application Data

(60) Provisional application No. 62/183,201, filed on Jun. 23, 2015, provisional application No. 62/186,383, (Continued)

(51) Int. Cl.
*H04W 4/02* (2018.01)
*H04W 68/02* (2009.01)
(Continued)

(52) U.S. Cl.
CPC .......... *H04W 4/023* (2013.01); *H04W 8/005* (2013.01); *H04W 8/02* (2013.01); *H04W 68/02* (2013.01); *H04W 68/06* (2013.01)

(58) Field of Classification Search
CPC ... H04W 68/00; H04W 68/005; H04W 68/02; H04L 29/06027
See application file for complete search history.

(56) References Cited

U.S. PATENT DOCUMENTS

2010/0278142 A1 11/2010 Dwyer et al.
2013/0090124 A1* 4/2013 Panchal ................ H04L 5/0096
455/452.1
(Continued)

FOREIGN PATENT DOCUMENTS

EP 2 247 033 B1 11/2013
WO 2011/043571 A2 4/2011
(Continued)

*Primary Examiner* — Diane D Mizrahi
(74) *Attorney, Agent, or Firm* — Dentons US LLP

(57) ABSTRACT

A method for managing an area of a terminal in a wireless communication system and an apparatus therefor are disclosed. Specifically, a method for performing, by a terminal, location area update in a wireless communication system may comprise the steps of: transmitting, to a network node, a first request message including an additional cell list comprising one or more neighboring cells of a serving cell of the terminal; receiving, from the network node, a first accept message including information indicating acceptance of the use of the additional cell list; and, when a changed serving cell of the terminal belongs to a tracking area configured to the terminal and does not belong to the additional cell list, performing a cell-based area update procedure.

11 Claims, 22 Drawing Sheets

Related U.S. Application Data filed on Jun. 30, 2015, provisional application No. 62/199,247, filed on Jul. 31, 2015, provisional application No. 62/209,902, filed on Aug. 26, 2015, provisional application No. 62/238,715, filed on Oct. 8, 2015.

(51) Int. Cl.
*H04W 68/06* (2009.01)
*H04W 8/00* (2009.01)
*H04W 8/02* (2009.01)

(56) References Cited

U.S. PATENT DOCUMENTS

2016/0373974 A1* 12/2016 Gomes ................ H04W 24/10
2018/0077624 A1* 3/2018 Jung ................... H04W 36/385

FOREIGN PATENT DOCUMENTS

| WO | 2013/109064 A1 | 7/2013 |
| WO | 2014/060926 A1 | 4/2014 |

\* cited by examiner

[FIG. 1]
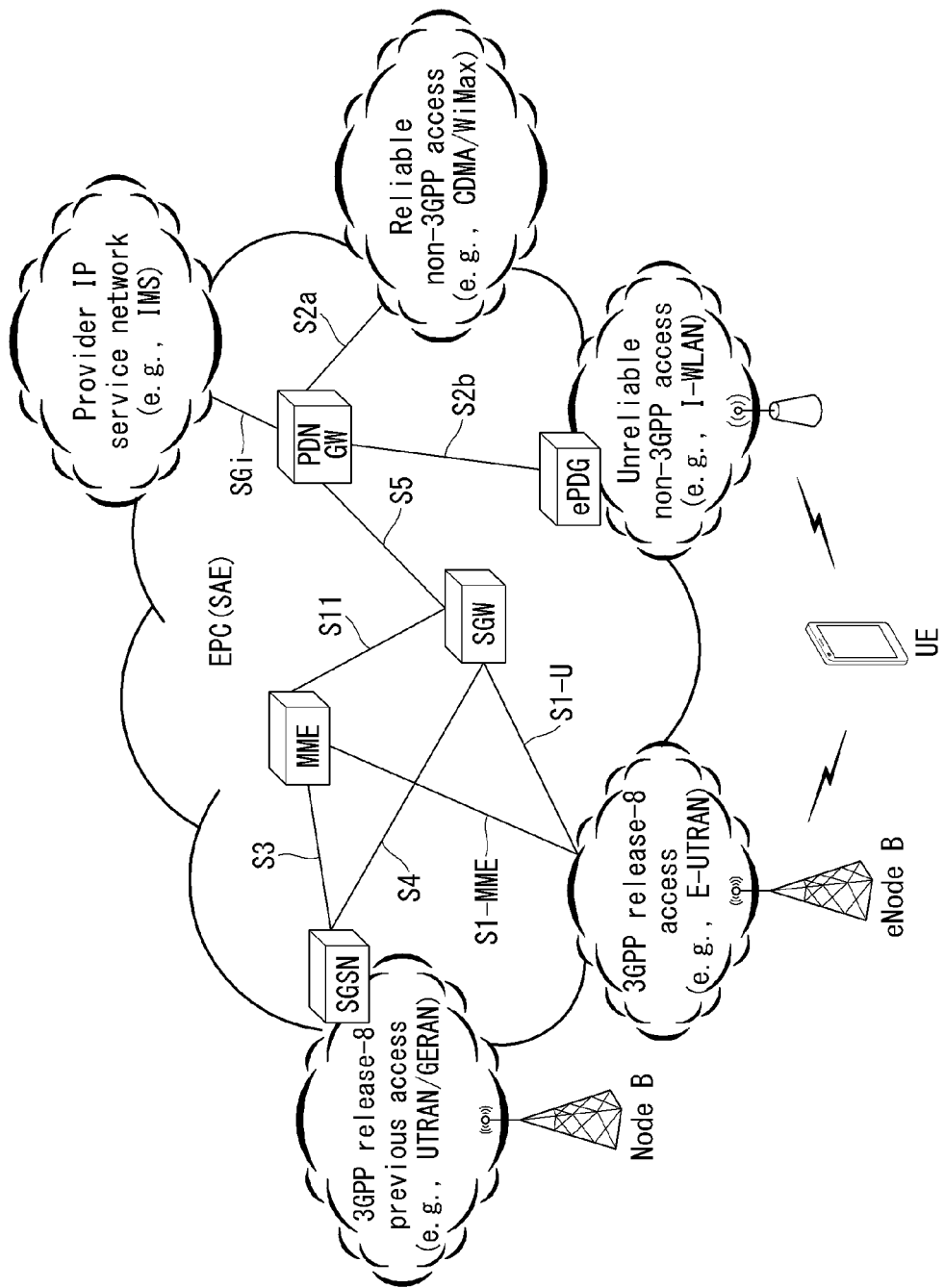

[FIG. 2]
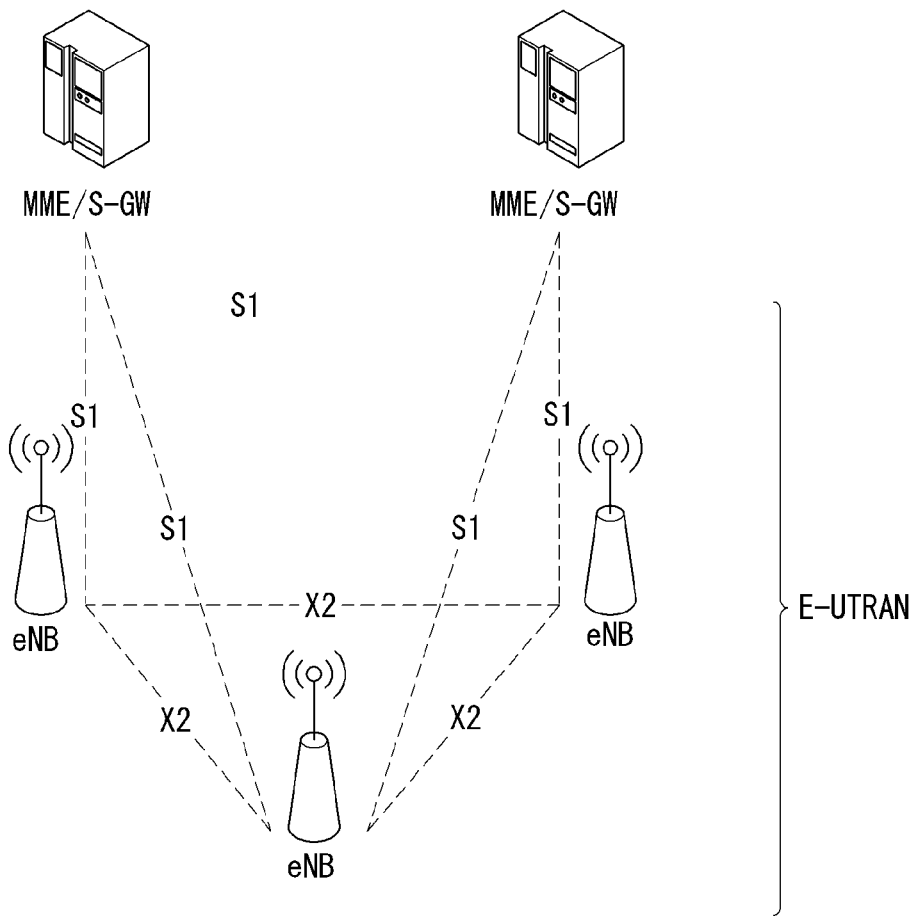

[FIG. 3]
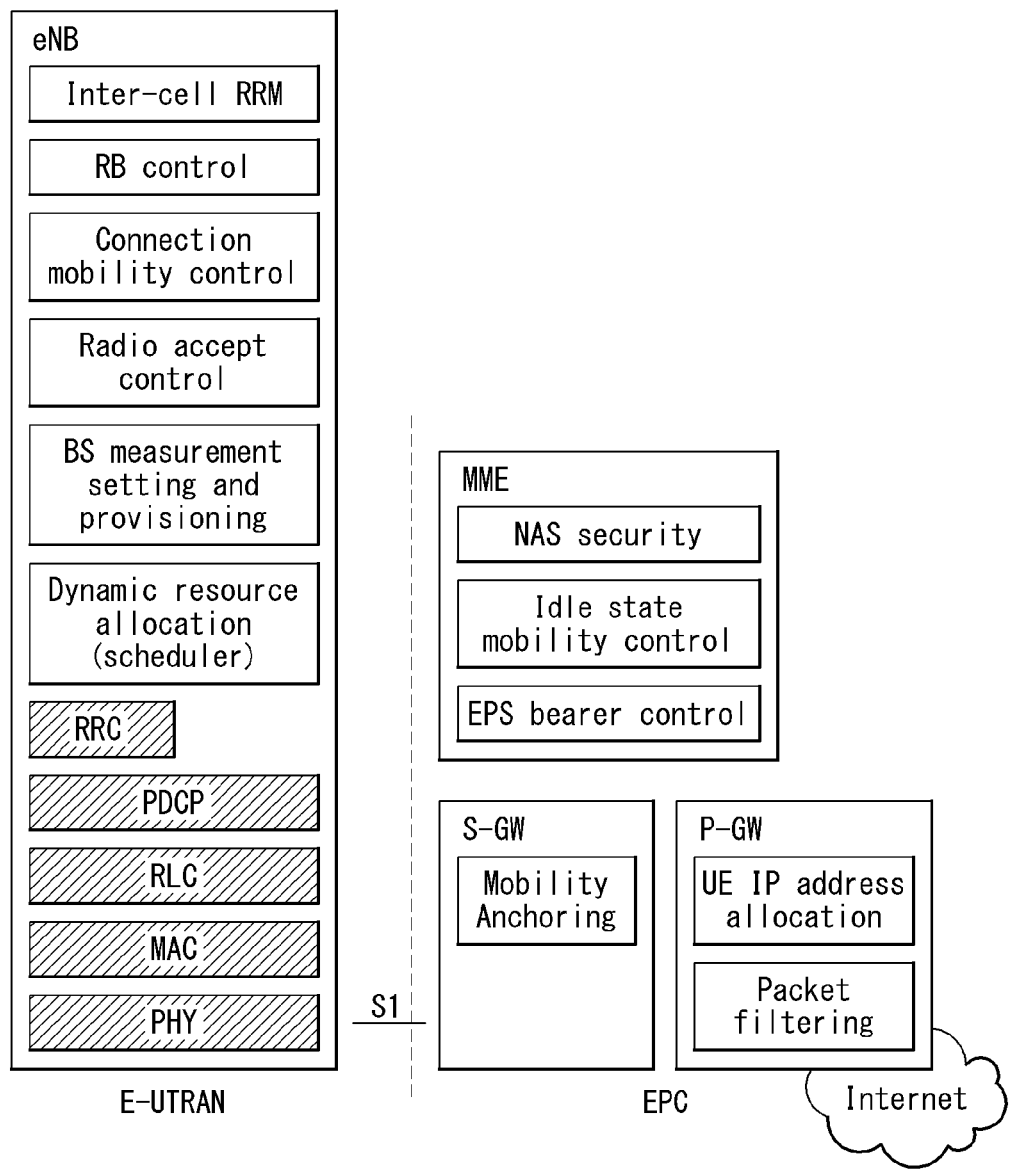

[FIG. 4]
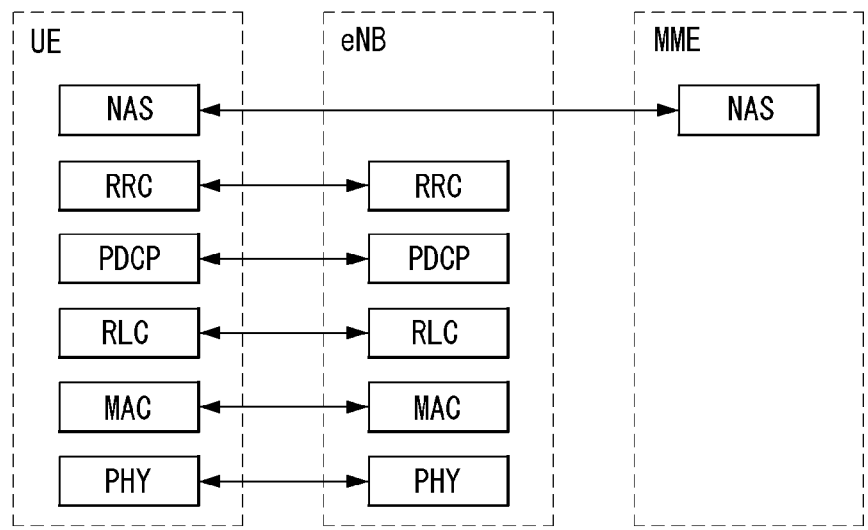
(a) Control plane protocol stack
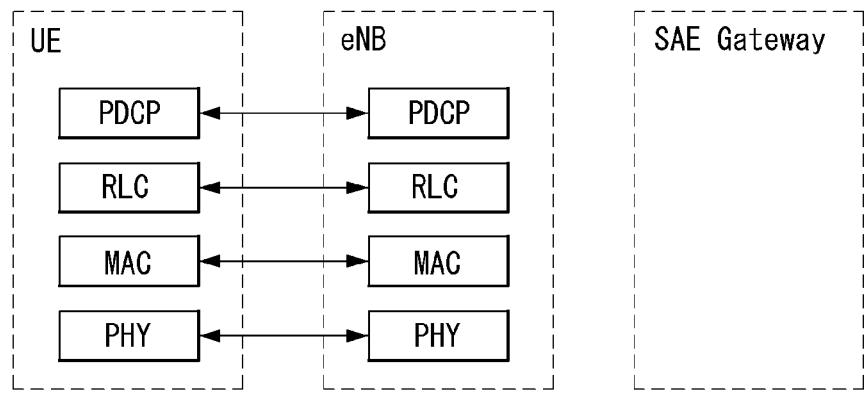
(b) User plane protocol stack

[FIG. 5]
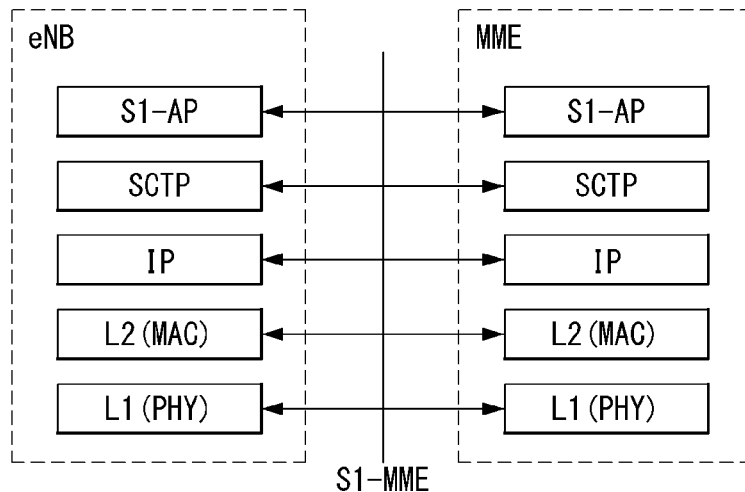
(a) Control plane protocol stack
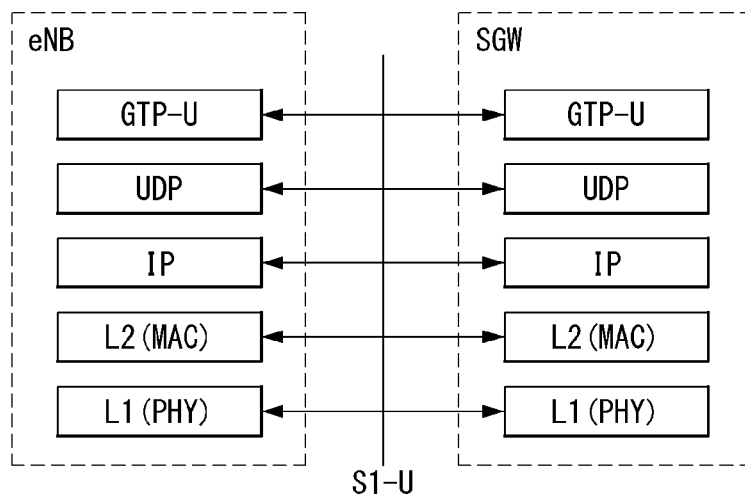
(b) User plane protocol stack

[FIG. 6]
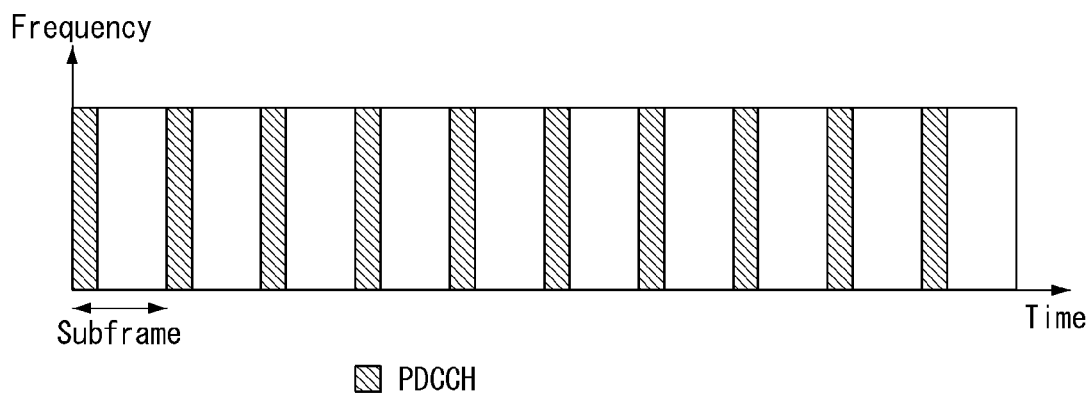
[FIG. 7]
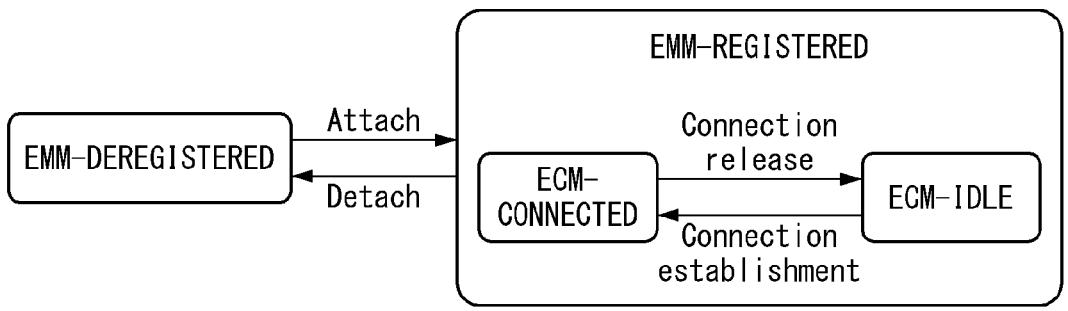

[FIG. 8]
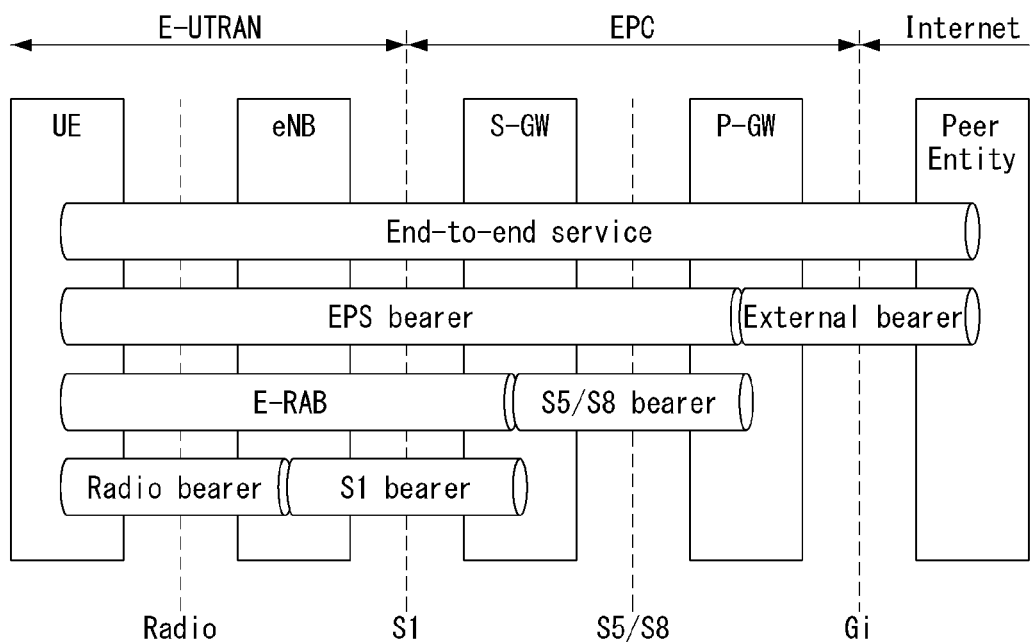

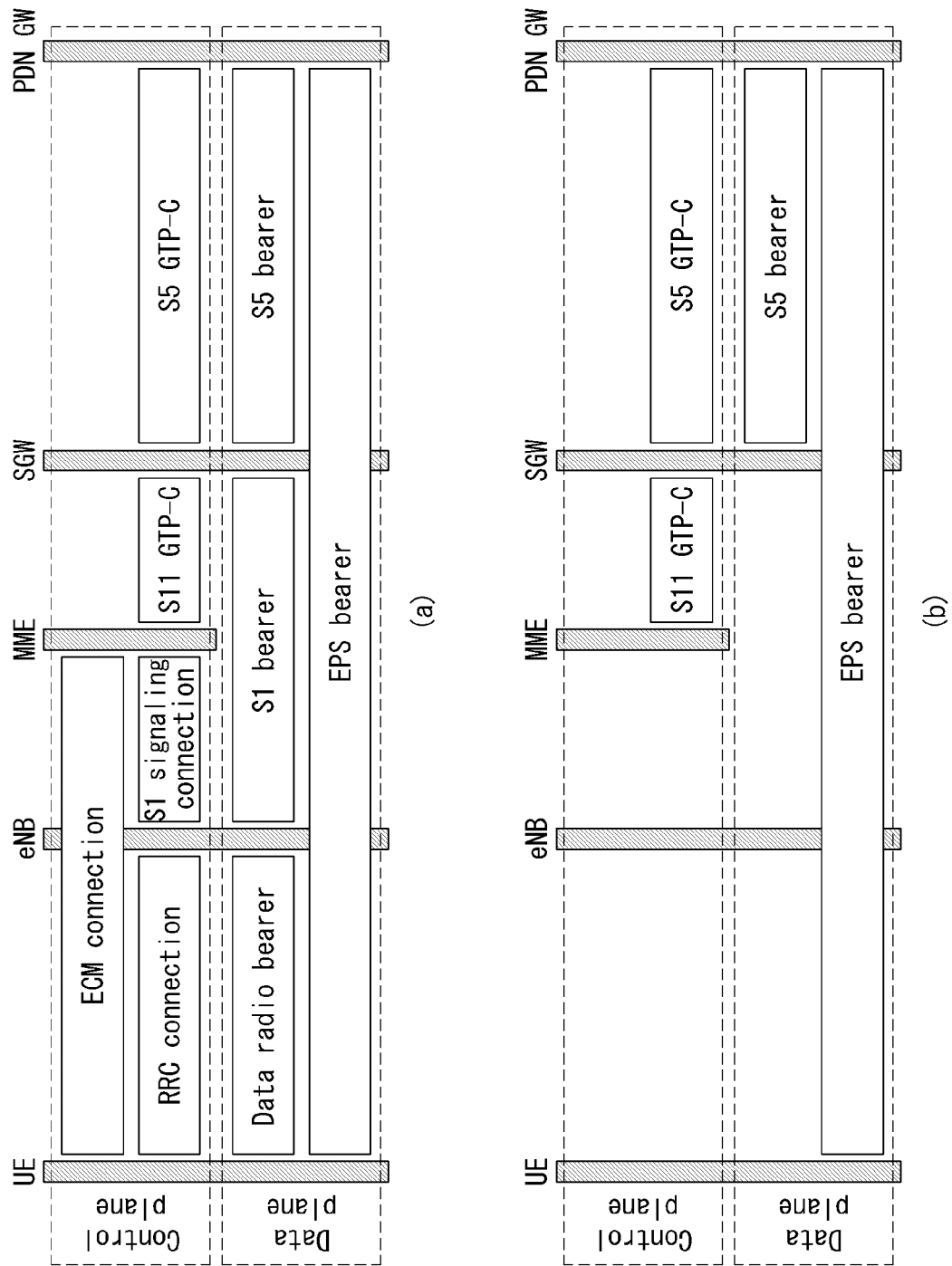
[FIG. 9]

[FIG. 10]
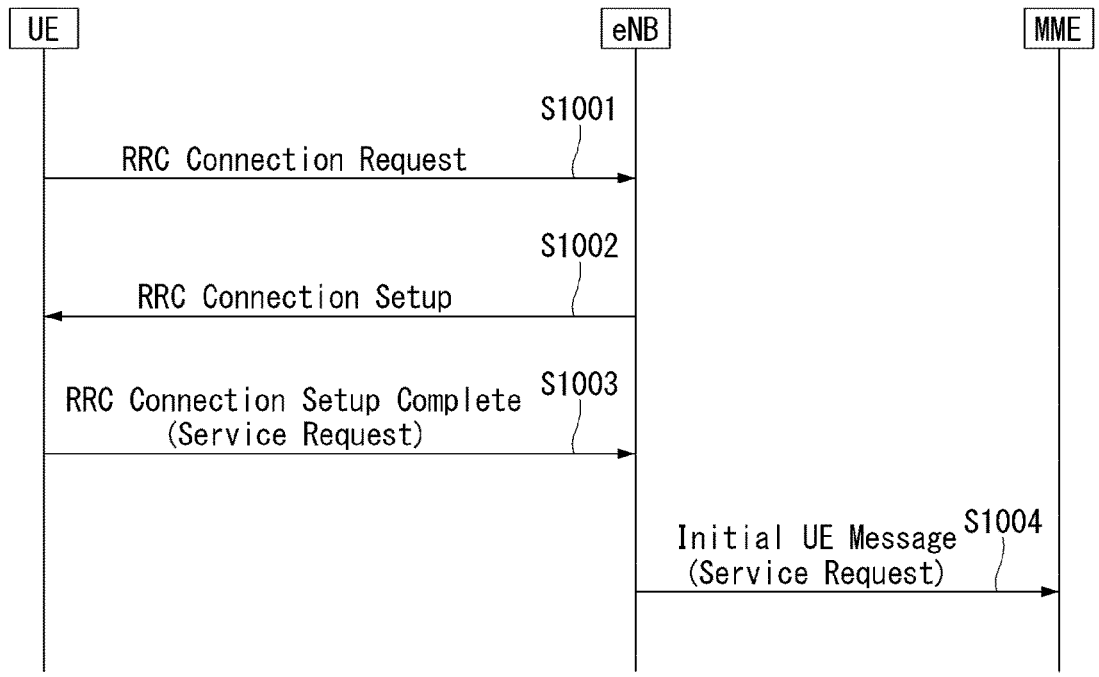
[FIG. 11]
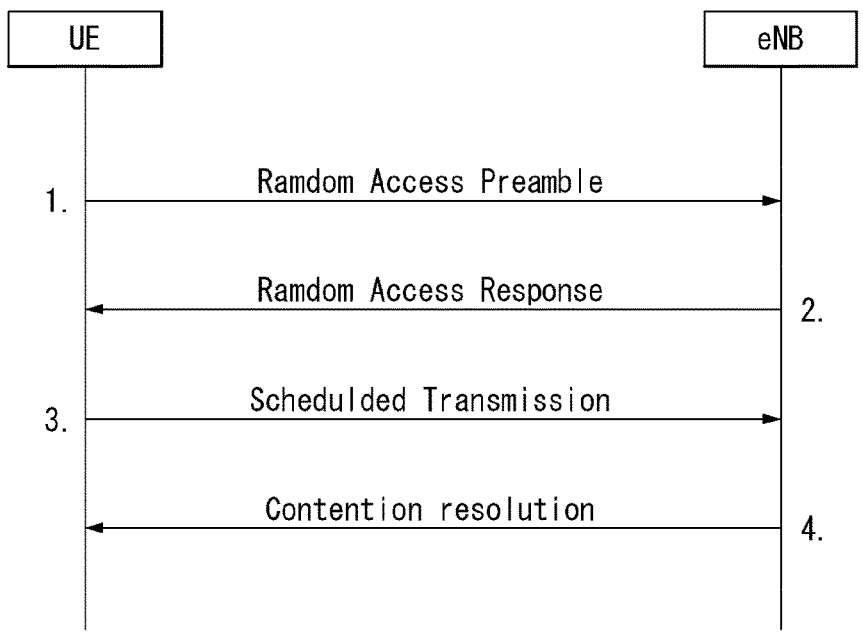

[FIG. 12]
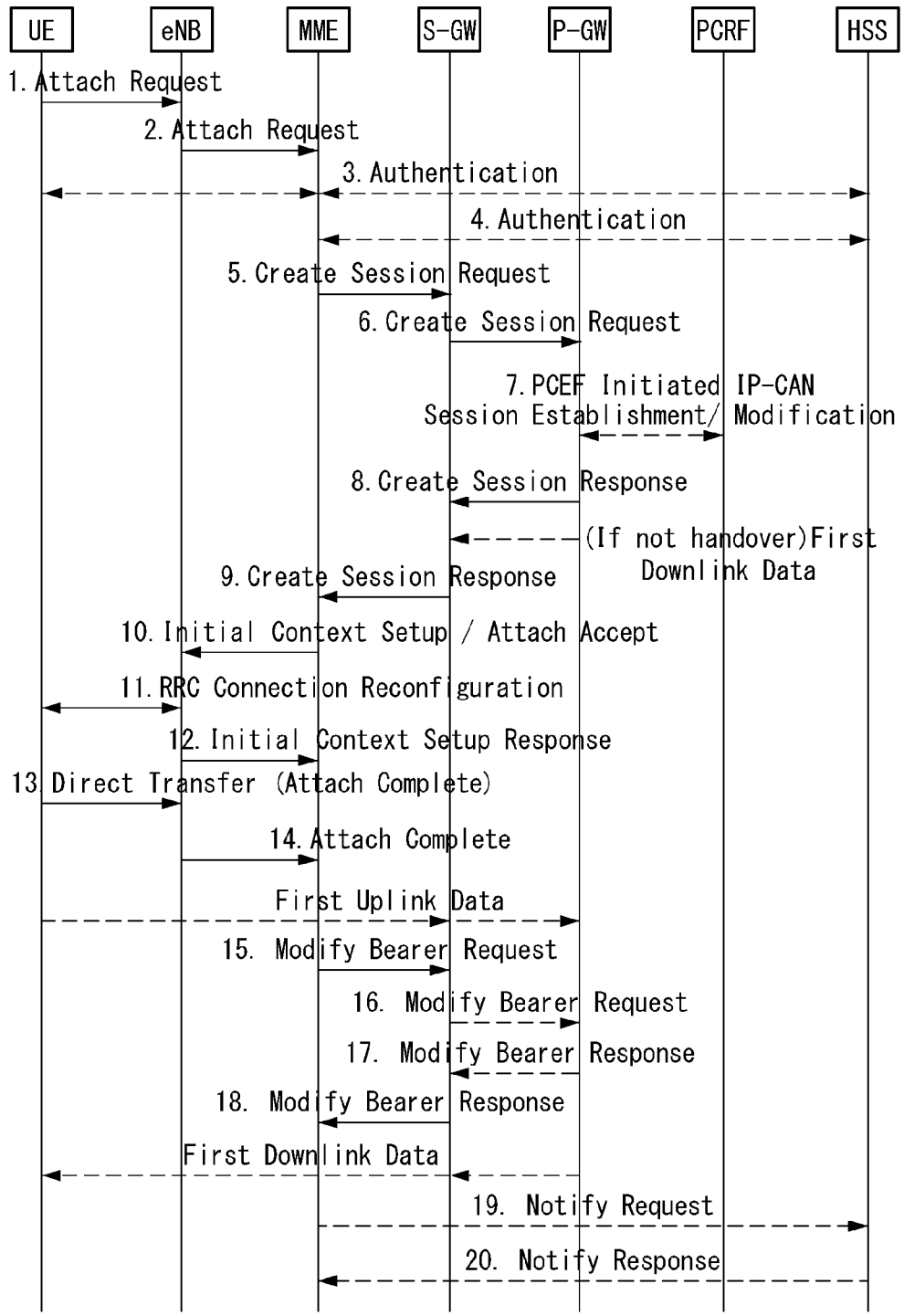

[FIG. 13]
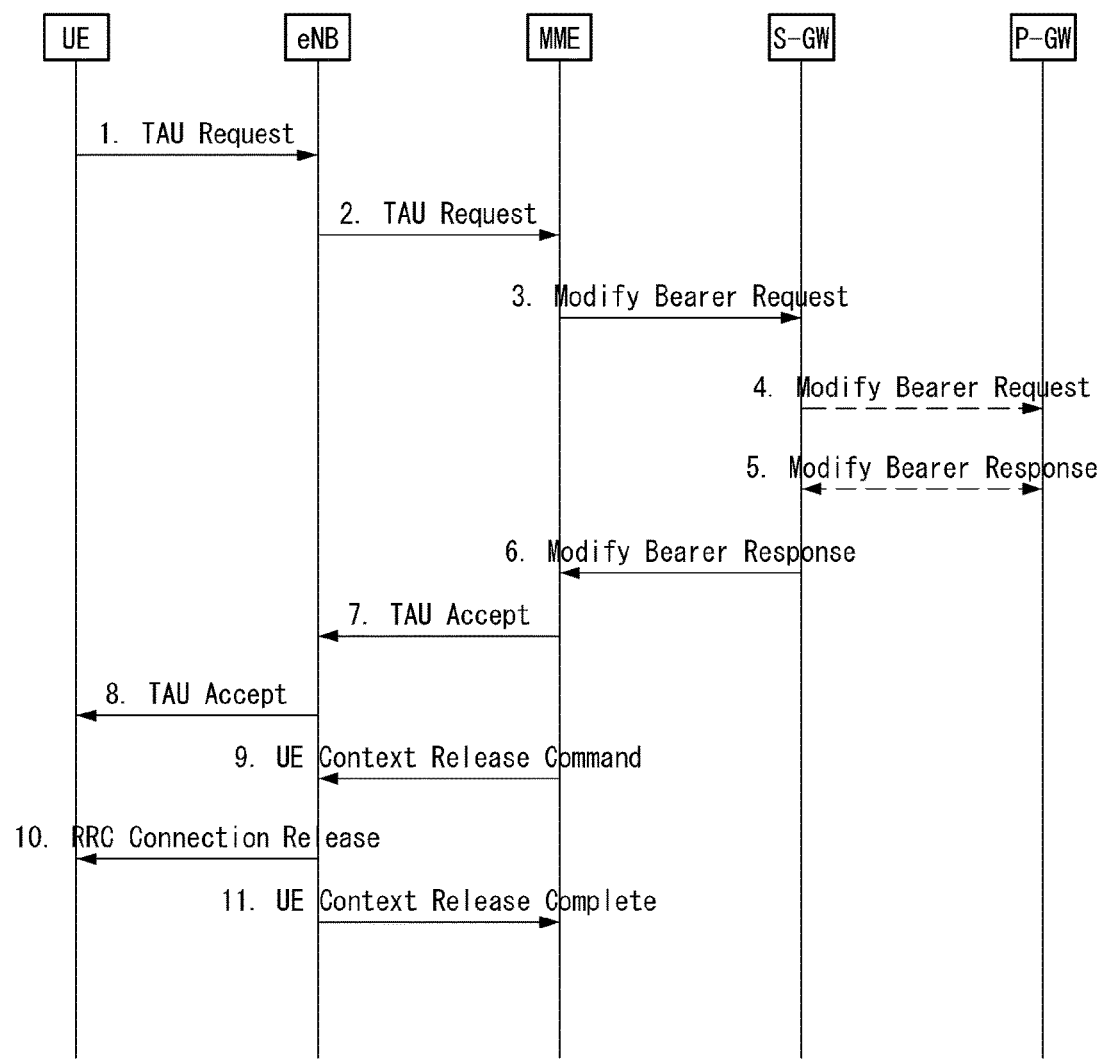

[FIG. 14]
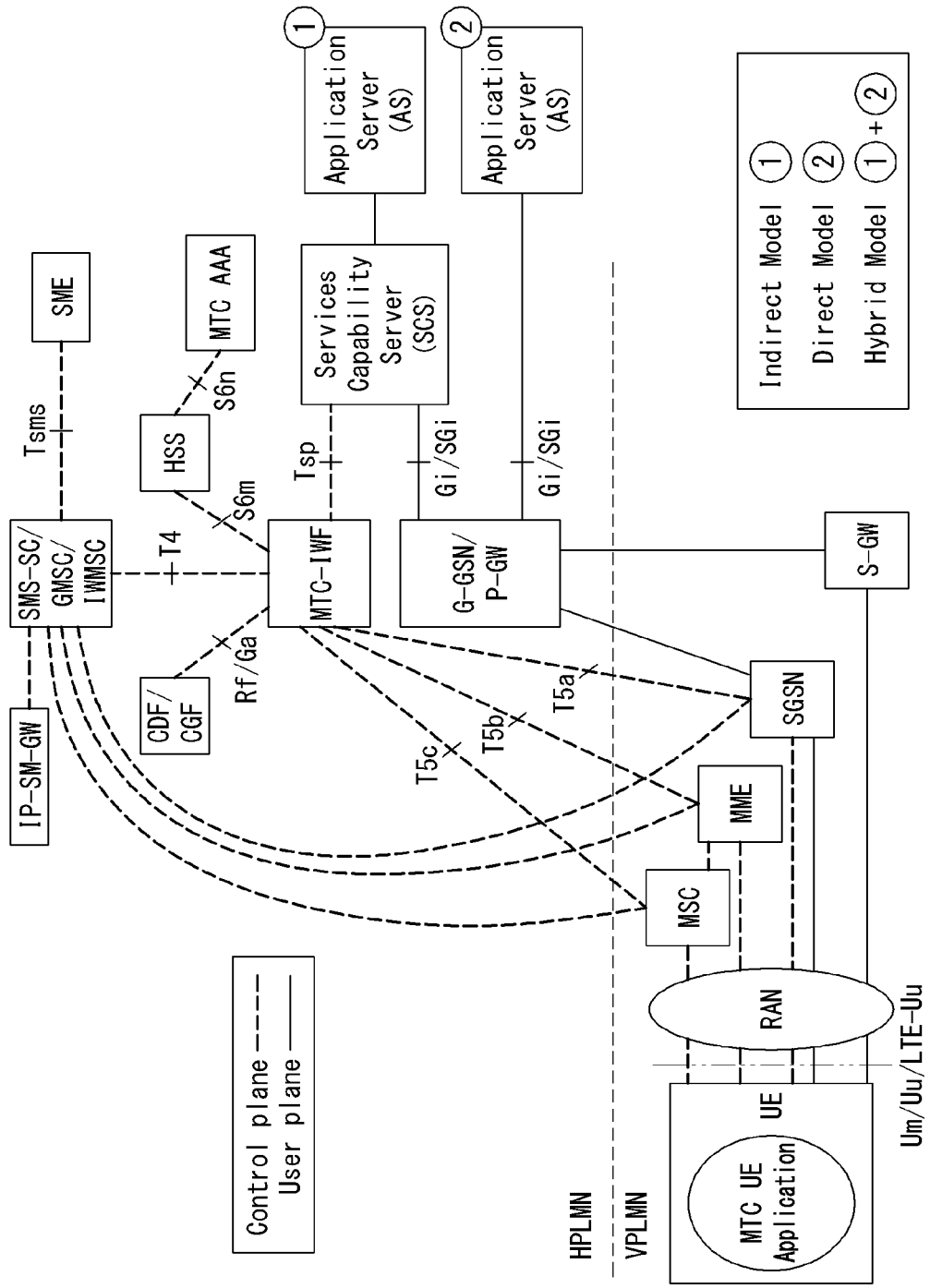

[FIG. 15]
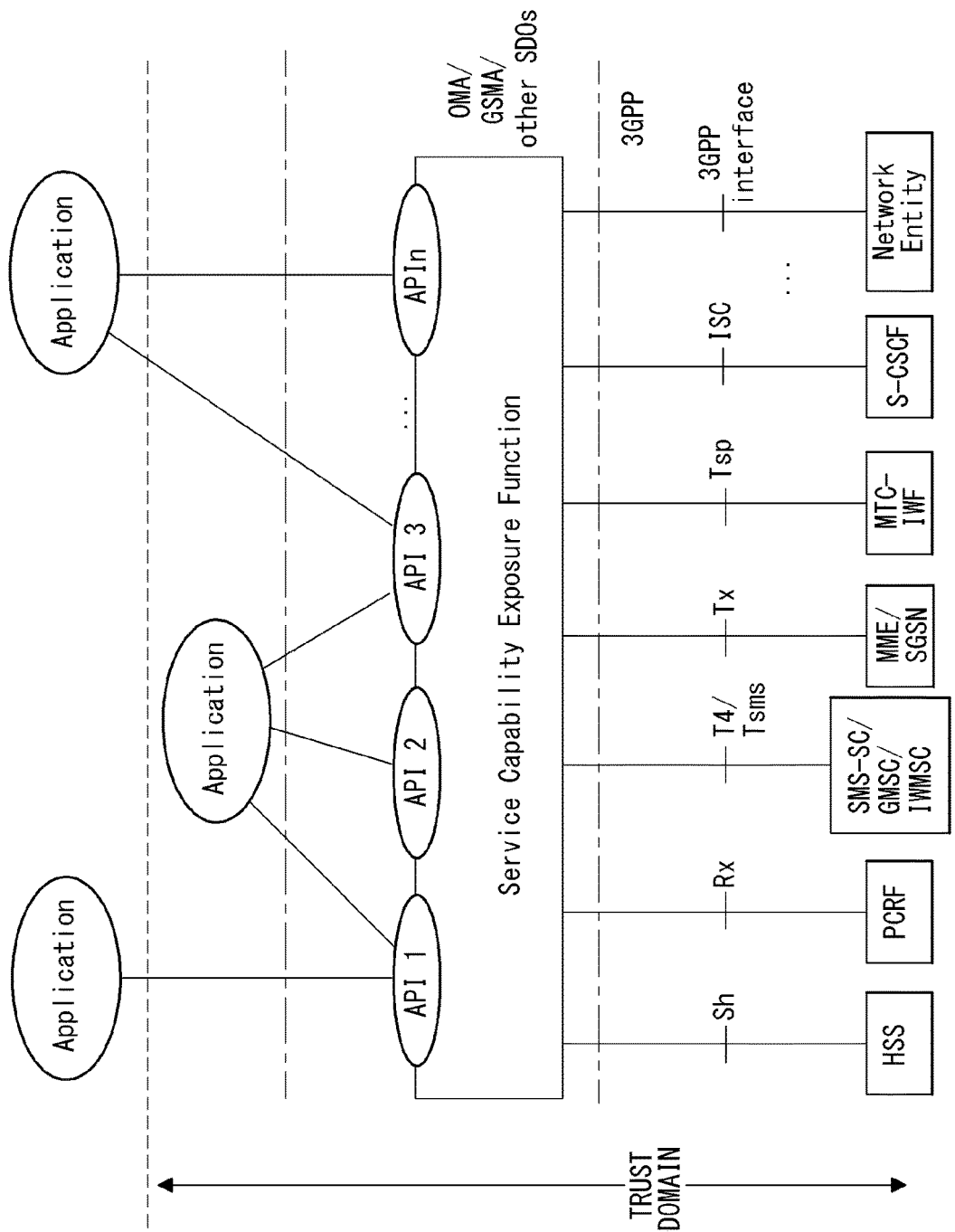

[FIG. 16]
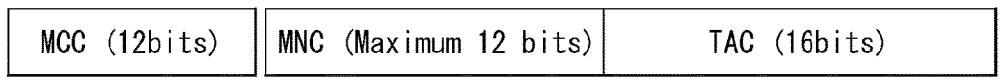
[FIG. 17]
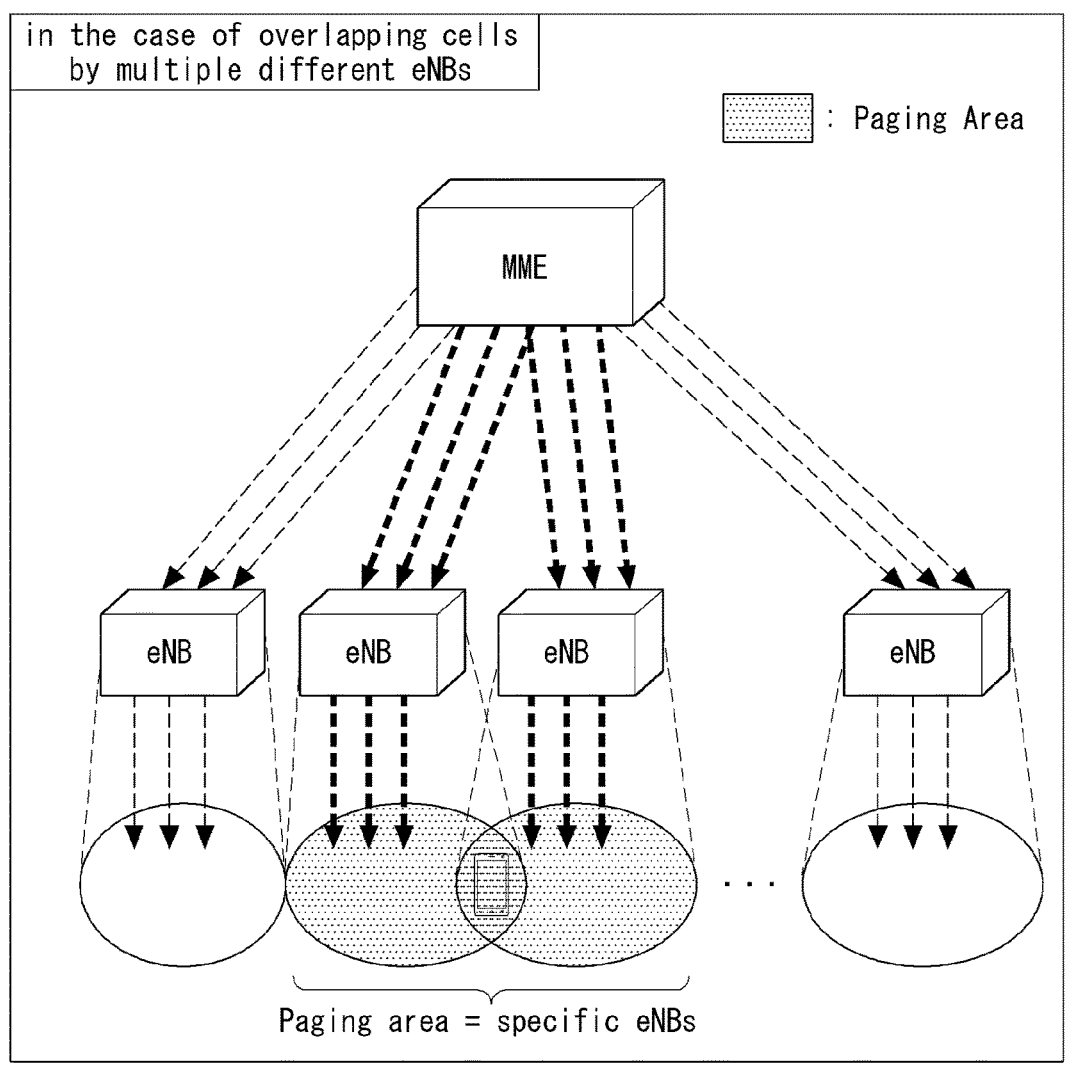

[FIG. 18]
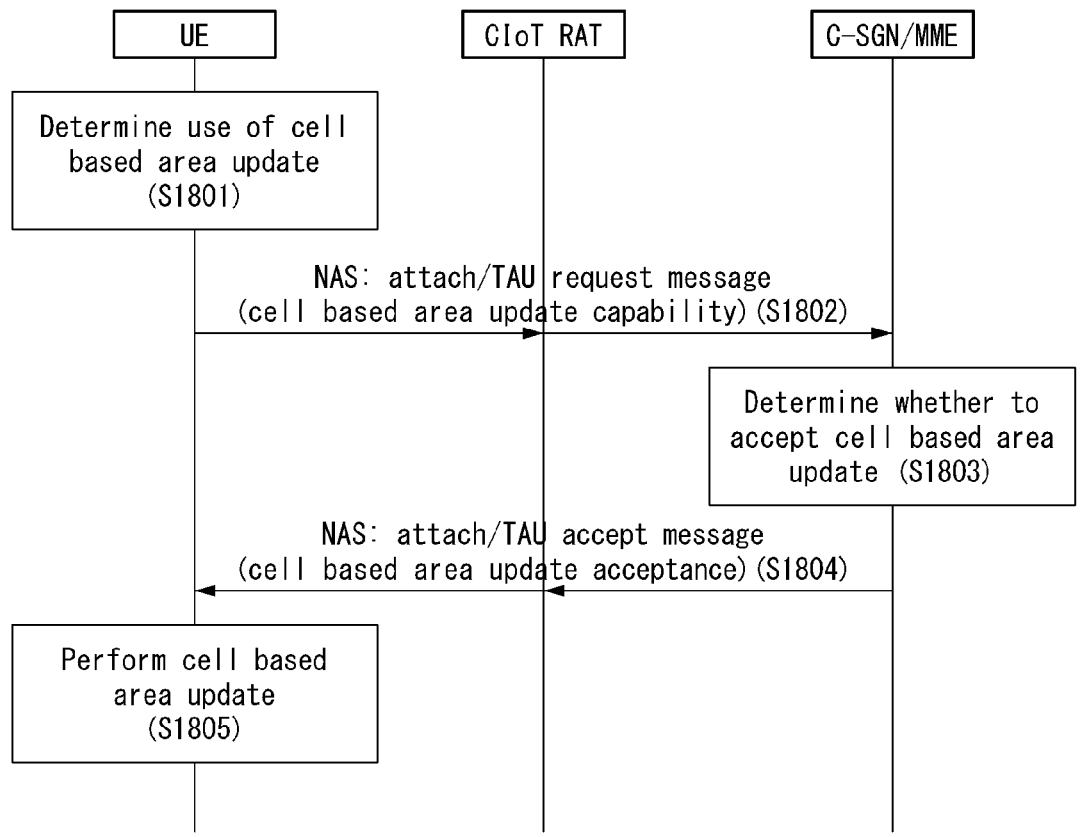

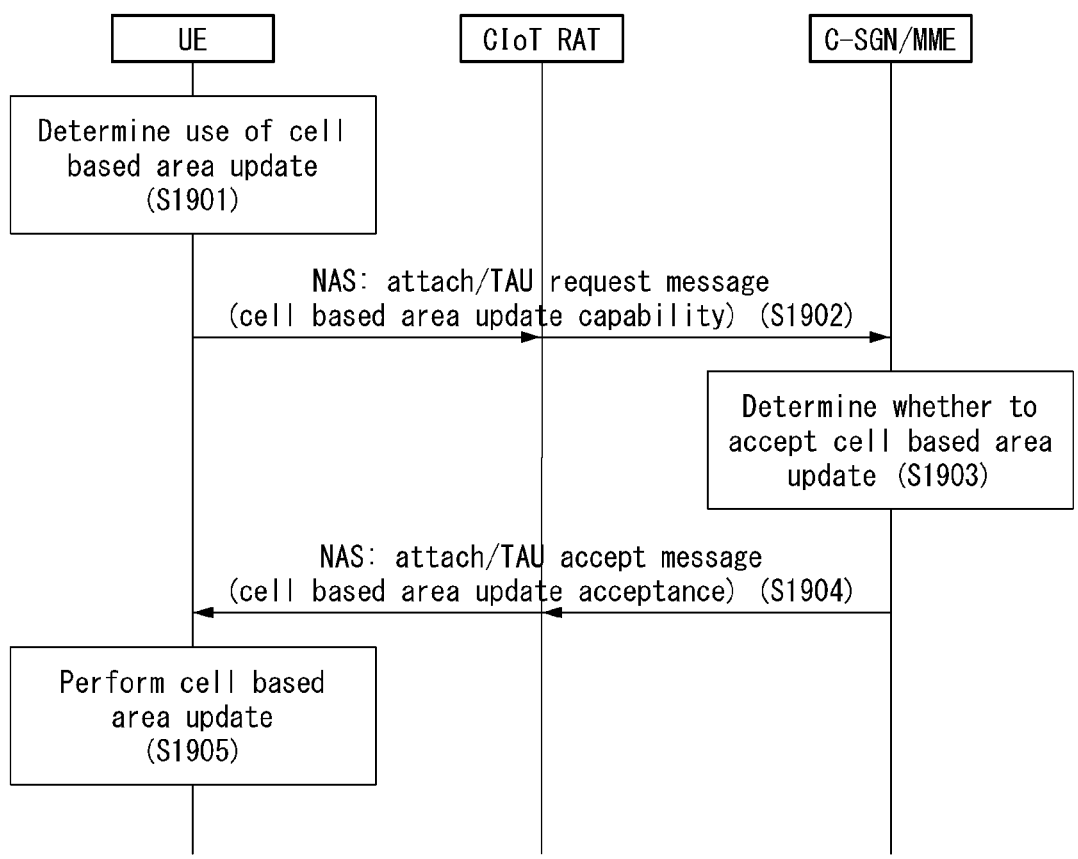
[FIG. 19]

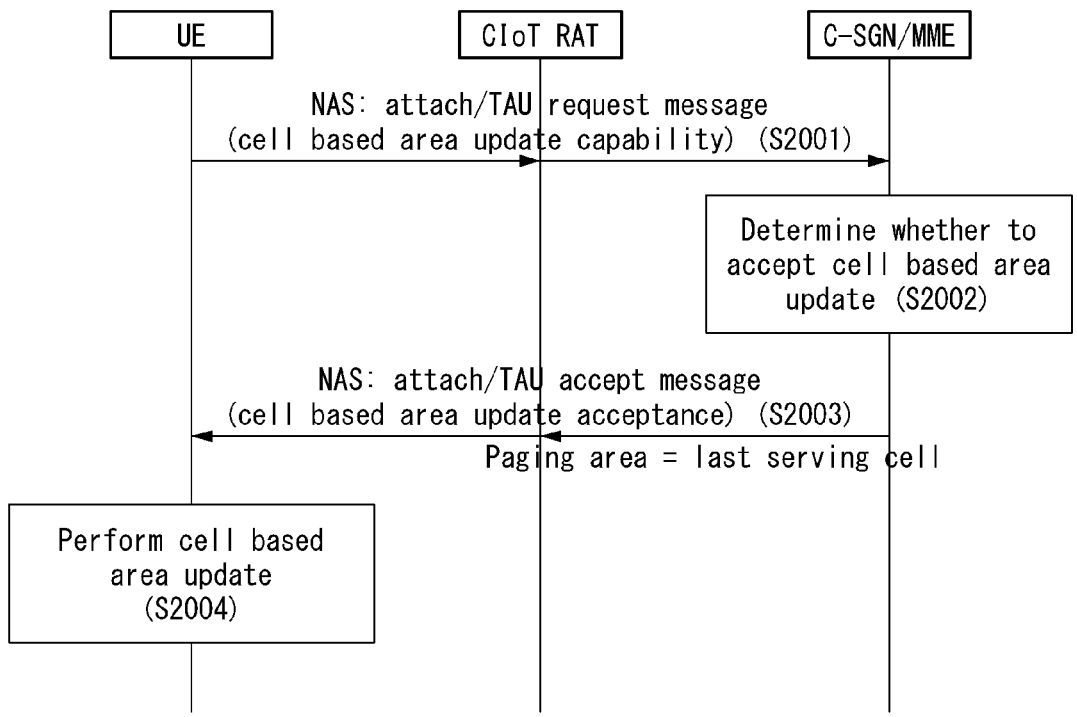
[FIG. 20]

[FIG. 21]
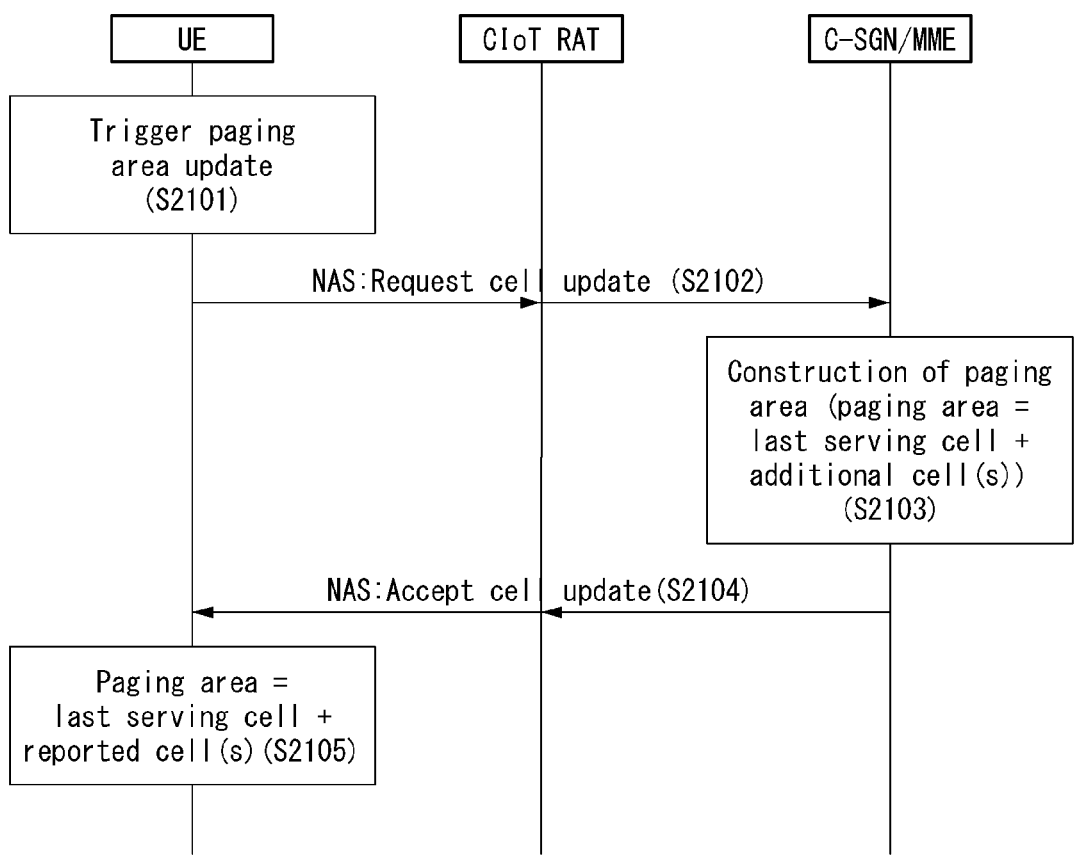

[FIG. 22]
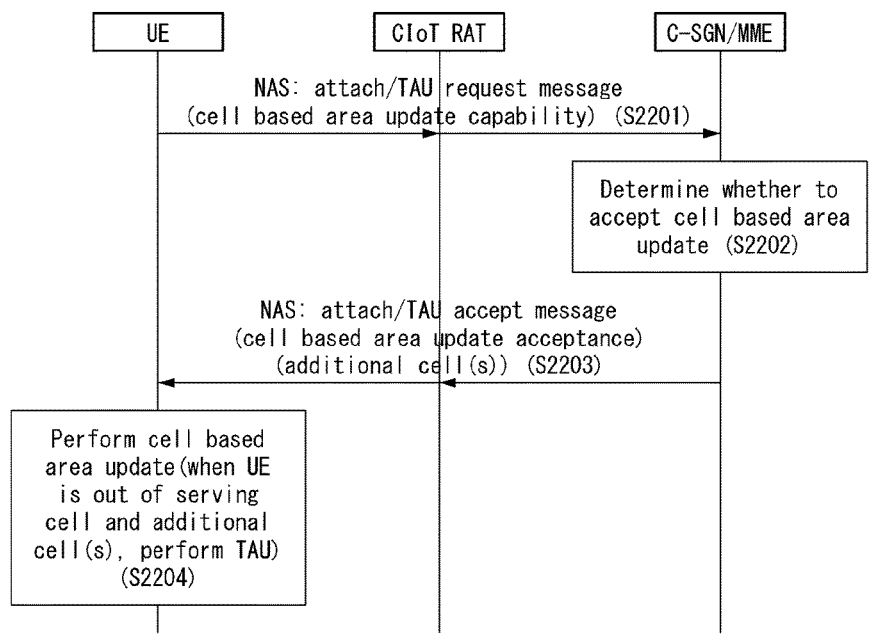
[FIG. 23]
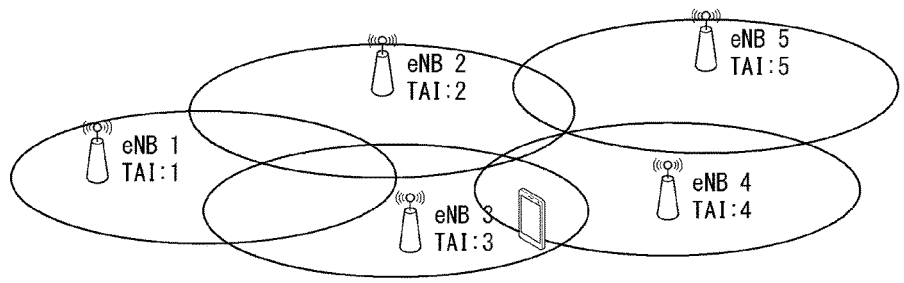

[FIG. 24]
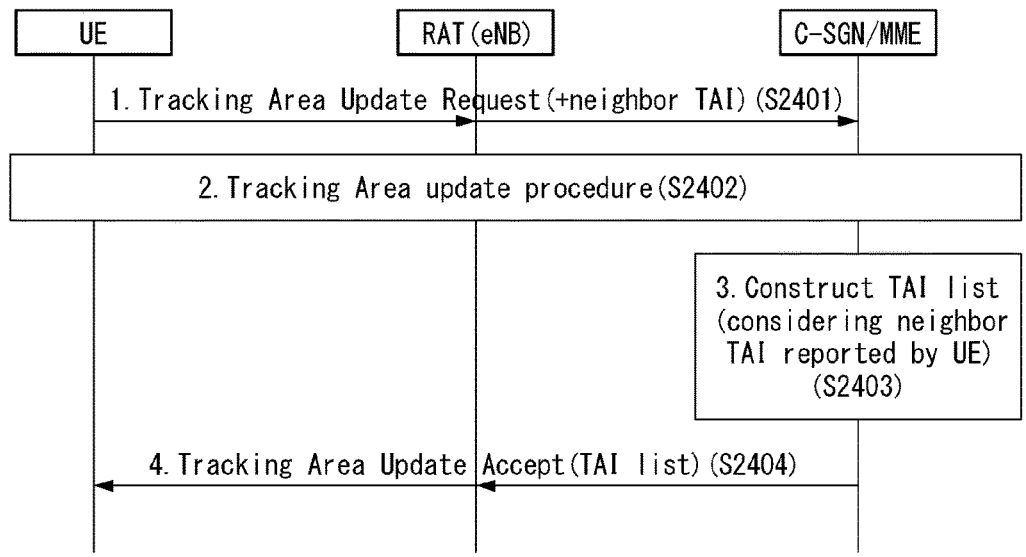
[FIG. 25]
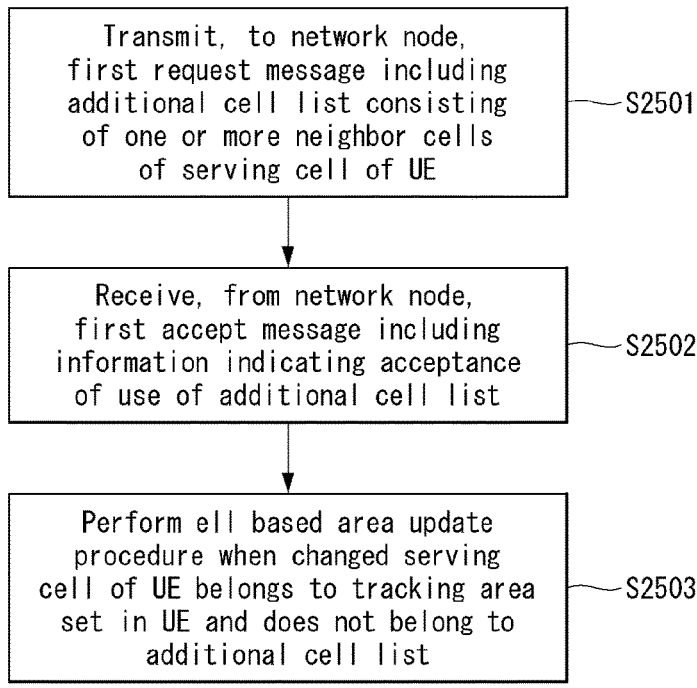

[FIG. 26]
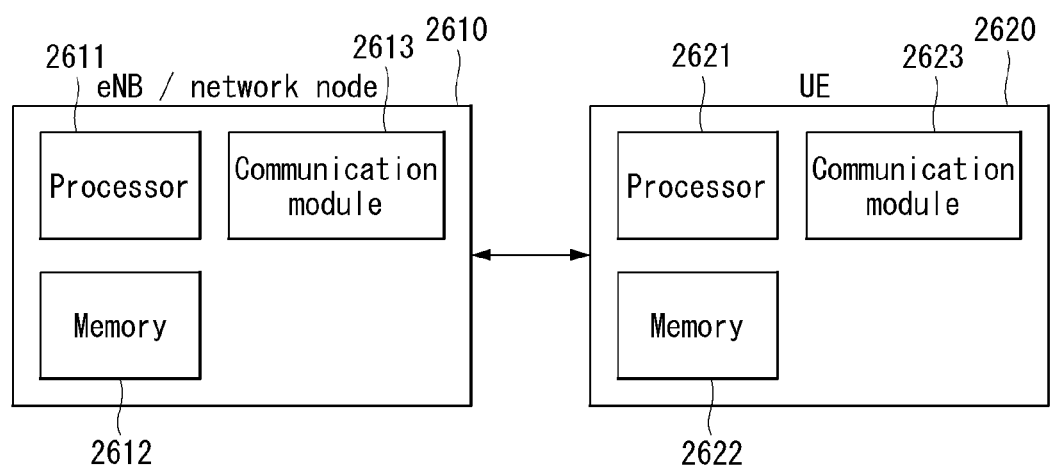

[FIG. 27]
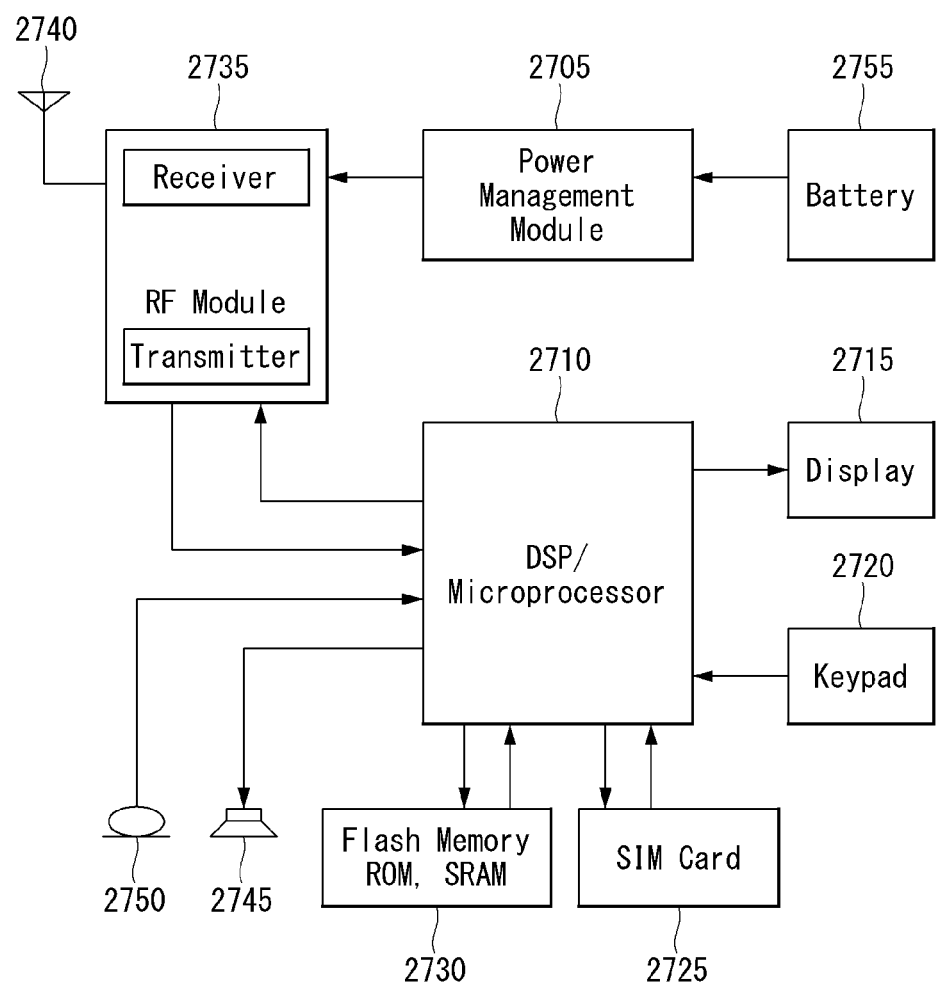

METHOD FOR MANAGING AREA OF TERMINAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/006693, filed on Jun. 23, 2016, which claims the benefit of U.S. Provisional Application No. 62/183,201, filed on Jun. 23, 2015, No. 62/186,383, filed on Jun. 30, 2015, No. 62/199,247, filed on Jul. 31, 2015, No. 62/209,902, filed on Aug. 26, 2015, No. 62/238,715, filed on Oct. 8, 2015, the contents of which are all hereby incorporated by reference herein in their entirety.

TECHNICAL FIELD

The present invention relates to a wireless communication system, and more particularly, to a method for managing a paging area/location area of a terminal and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for managing a paging area for efficient paging transmission to a terminal, in particular, a terminal (e.g., cellular Internet of things (IoT) having a no mobility/low mobility feature.

Further, an object of the present invention is to propose a method for managing a location area for efficiently managing a location of a terminal, in particular, a terminal having a no mobility/low mobility feature.

The technical problems solved by the present invention are not limited to the above technical problems and those skilled in the art may understand other technical problems from the following description.

Technical Solution

According to an aspect of the present invention, a method for performing, by a terminal, location area update in a wireless communication system may include: transmitting, to a network node, a first request message including an additional cell list comprising one or more neighboring cells of a serving cell of the terminal; receiving, from the network node, a first accept message including information indicating acceptance of the use of the additional cell list; and when a changed serving cell of the terminal belongs to a tracking area configured to the terminal and does not belong to the additional cell list, performing a cell based area update procedure.

According to another aspect of the present invention, a terminal for performing location area update in a wireless communication system may include: a communication module for transmitting/receiving a signal; and a processor controlling the communication module, in which the processor may be configured to transmit, to a network node, a first request message including an additional cell list comprising one or more neighboring cells of a serving cell of the terminal, receive, from the network node, a first accept message including information indicating acceptance of the use of the additional cell list, and perform a cell based area update procedure when a changed serving cell of the terminal belongs to a tracking area configured to the terminal and does not belong to the additional cell list.

Preferably, while the cell based area update procedure is performed, the additional cell list comprising one or more neighbor cells of the changed serving cell of the terminal may be transmitted to the network node.

Preferably, after the first accept message is received, a paging area of the terminal may be comprised of the serving cell of the terminal and the additional cell list.

Preferably, the method may further include: transmitting, to the network node, a second request message including information indicating a supportable capability of the cell based area update procedure; and receiving, from the network node, a second accept message including information indicating the acceptance of the cell based area update procedure.

Preferably, after the second accept message is received, the paging area of the terminal may be comprised of the serving cell of the terminal.

Preferably, Further, the second accept message may include information on the maximum number of cells which can be included in the additional cell list, and the number of cells belonging to the additional cell list may not exceed the maximum cell number.

Preferably, in case that the second accept message includes an additional cell list determined by the network node, when the changed serving cell of the terminal belongs to a tracking area configured to the terminal and does not belong to the received additional cell list, the cell based area update procedure may be performed.

Preferably, after the second accept message is received, the paging area of the terminal may be constituted by the serving cell of the terminal and the received additional cell list.

Preferably, the method may further include, when the changed serving cell of the UE does not belong to the tracking area configured to the terminal, performing a tracking area update procedure.

Preferably, when the neighbor cell of the changed serving cell of the terminal belongs to a tracking area different from the changed serving cell of the terminal, a first tracking area identifier to which the changed serving cell belongs and a second tracking area identifier to which the neighbor cell belongs may be transmitted to the network node during the tracking area update procedure.

Preferably, after the tracking area update procedure is completed, the paging area of the terminal is comprised of the first tracking area identifier and the second tracking area identifier.

Advantageous Effects

According to an embodiment of the present invention, paging can be efficiently transmitted to a terminal, particularly, a terminal (e.g., a CIoT terminal) having a no mobility/low mobility feature.

According to the embodiment of the present invention, when the paging is transmitted to the terminal, particularly, the terminal having the no mobility/low mobility feature, in the case where paging resources are sufficient, a paging error can be reduced by setting a paging area to a large range.

Further, according to the embodiment of the present invention, when the paging is transmitted to the terminal, particularly, the terminal having the no mobility/low mobility feature, in the case where paging resources are insufficient, the paging resource can be saved by minimizing the paging area.

In addition, according to the embodiment of the present invention, a location of the terminal, particularly, the terminal having the no mobility/low mobility feature in a network can be accurately determined.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 illustrates a structure of an S1 interface protocol to which the present invention can be applied.

FIG. 6 is a diagram schematically exemplifying a structure of physical channel in a wireless communication system to which the present invention can be applied.

FIG. 7 is a diagram exemplifying states of EMM and ECM in a wireless communication system to which the present invention can be applied.

FIG. 8 exemplifies a bearer structure in a wireless communication system to which the present invention can be applied.

FIG. 9 is a diagram exemplifying a transmission path of a control plane and a user plane in an EMM registered state in a wireless communication system to which the present invention can be applied.

FIG. 10 is a diagram exemplifying an ECM connection establishment procedure in a wireless communication system to which the present invention can be applied.

FIG. 11 is a diagram for describing the contention-based random access procedure in the wireless communication system to which the present invention can be applied.

FIG. 12 is diagram schematically exemplifying an attach procedure in a wireless communication system to which the present invention can be applied.

FIG. 13 is a diagram schematically exemplifying a periodic tracking area update procedure in a wireless communication system to which the present invention can be applied.

FIG. 14 is a diagram exemplifying a machine-type communication (MTC) architecture in a wireless communication system to which the present invention can be applied.

FIG. 15 exemplifies an architecture for service capability exposure in a wireless communication system to which the present invention can be applied.

FIG. 16 is a diagram exemplifying a tracking area identifier in a wireless communication system to which the present invention can be applied.

FIG. 17 is a diagram exemplifying an example of a paging method in a wireless communication system to which the present invention can be applied.

FIG. 18 is a diagram exemplifying a method for determining a cell-based area update according to an embodiment of the present invention.

FIG. 19 is a diagram exemplifying a method for determining a cell-based area update according to an embodiment of the present invention.

FIG. 20 is a diagram exemplifying a method for determining a cell-based area update according to an embodiment of the present invention.

FIG. 21 is a diagram exemplifying a cell-based area update procedure according to an embodiment of the present invention.

FIG. 22 is a diagram exemplifying a method for determining a cell-based area update according to an embodiment of the present invention.

FIG. 23 is a diagram exemplifying a method for managing a paging area according to an embodiment of the present invention.

FIG. 24 is a diagram exemplifying a method for managing a tracking area according to an embodiment of the present invention.

FIG. 25 is a diagram exemplifying a method for updating a location area according to an embodiment of the present invention.

FIG. 26 exemplifies a block diagram of a communication apparatus according to an embodiment of the present invention.

FIG. 27 exemplifies a block diagram of a communication apparatus according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 is a diagram schematically exemplifying a structure of physical channel in a wireless communication system to which the present invention can be applied.

Referring to FIG. 6, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

FIG. 8 illustrates a bearer structure in a wireless communication system to which the present invention can be applied.

When the UE is connected to a Packet Data Network (PDN) (which is the peer entity of FIG. 8), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 9 illustrates transmission paths of a control plane and a user plane in an EMM registration state in a wireless communication system to which the present invention can be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 9(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

FIG. 10 is a diagram exemplifying an ECM connection establishment procedure in a wireless communication system to which the present invention can be applied.

Referring to FIG. 10, a UE transmits a RRC connection request message to an eNB for requesting RRC connection (step, S1001).

The RRC connection request message includes a UE Identity (e.g., SAE temporary mobile subscriber identity (S-TMSI) or random ID) and an establishment cause.

The establishment cause may be determined according to NAS procedure (e.g., attach, detach, tracking area update, service request and extended service request).

The eNB transmits a RRC connection setup message to the UE in response to the RRC connection request message (step, S1002).

After receiving the RRC connection setup message, the UE transits to RRC_CONNECTED mode.

The UE transmits a RRC connection setup complete message to the eNB for verifying successful completion of the RRC connection establishment (step, S1003).

The UE transmits the RRC connection setup complete message with NAS message (e.g., initial attach message, service request message, etc.) being included to the eNB.

The eNB acquires the service request message from the RRC connection setup complete message, and transmits this to the MME through the Initial UE message, which is S1AP message (step, S1004).

The control signals between the eNB and the MME may be delivered through S1AP message with S1-MME interface. The S1AP message is delivered through S1 signaling connection for each user, and the S1 signaling connection is defined by an identity pair (i.e., eNB UE S1AP ID and MME UE S1AP ID) such that the eNB and the MME distinguish the UE.

The eNB transmits the Initial UE message including eNB UE S1AP ID by allocating eNB UE S1AP ID, and the MME setup S1 signaling connection between the eNB and the MME by allocating MME S1AP UE ID by receiving the Initial UE message.

Random Access Procedure

Hereinafter, a random access procedure which is provided in a LTE/LTE-A system will be described.

The random access procedure is used for a UE to obtain the UL synchronization with an eNB or to be allocated with UL radio resource. After turning on the power of UE, the UE acquires the DL synchronization with an initial cell and receives the system information. The UE gains the information of the set of usable random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that a UE performs the random access procedure.

In case that the UE performs an initial access in a RRC idle state without any RRC connection to an eNB In case that the UE performs a RRC connection re-establishment procedure In case that the UE tries to an initial access to a target cell in a handover procedure In case that an random access procedure is requested by the order from eNB In case that there is any data that is going to be transmitted to DL in a non-synchronized condition during the RRC connected state In case that there is any data that is going to be transmitted to UL in a non-synchronized condition and in a condition that the radio resource designated for requesting the radio resource is not allocated during the RRC connected state In case that the UE positioning is performed in a condition that timing advance is required during the RRC connected state In case that restoration procedure is performed in a radio link failure or handover failure In 3GPP Rel-10, it is considered that the timing advance (TA) value that is applicable to a specific cell (for example, PCell) in a wireless access system that supports the carrier aggregation is applied to a plurality of cells in common. However, the UE may aggregate a plurality of cells that are included in different frequency bands (that is, spaced apart on the frequency domain) or a plurality of cells that have different propagation characteristics. In addition, in case of a specific cell, for the extension of coverage or the removal of coverage hole, in a condition that small cells such as a remote radio header (RRH) (that is, repeater), a femto cell, or a pico cell, etc. or a secondary eNB (SeNB) is arranged in the cell, the UE performs a communication with the eNB (that is, macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, may be applied to all the cells within the pTAG. Meanwhile, in case of TAG (that is, secondary TAG (sTAG)) that is configured with SCells only, the TA, which is determined based on a specific SCell within sTAG, may be applied to all the cells within the relevant sTAG, and in this time, the TA may be acquired through the random access procedure by being initiated by the eNB. Particularly, the SCell in the sTAG is set to be RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using Random Access Radio Network Temporary Identifier (RA-RNTI). The TA that is determined based on SCell that successfully completes the random access may be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure may be used only for the handover procedure, the UE positioning, case of being requested by the order of eNB and/or the timing advance alignment for the sTAG. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the RN subframe configuration at the moment. That is, it means that the RN subframe configuration is temporarily terminated. But, the RN subframe configuration is initiated at the time when the random access procedure has been successfully completed.

FIG. 11 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (for example, indicating the size of msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC- RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH. It is desirable to include the information of UE that is to receive the PDSCH, frequency and the time information of the PDSCH radio resource, and transmission type of the PDSCH, etc. in the PDCCH. As described above, if succeeding in detecting the PDCCH that is transmitted to the UE itself, the UE may receive properly the random access response that is transmitted on the PDSCH according to the PDCCH information.

The random access response window represents the maximum time duration when the UE that transmits the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

For the transmission on the UL SCH, the UE-specific scrambling is used. If the UE has been allocated C-RNTI, the scrambling is performed based on the C-RNTI. However, if the UE has not been allocated C-RNTI yet, the scrambling is not performed based on the C-RNTI but uses TC-RNTI that is received from the random access response instead. If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

The following is a description of the method for collision resolution in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the corresponding UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE determines itself to succeed in the contention and normally terminates the random access. In the contrary, if the PDCCH information that is addressed by the C-RNTI of its own is not received before the contention resolution timer is terminated, the UE determines itself to fail in the contention and reinitiates the random access procedure, or informs the fact of failure to the higher layer. In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant information included in the random access response, and operates the contention resolution timer. In case that the data including the higher identifier of its own is transmitted to DL-SCH before the contention resolution timer is terminated, the UE determines that the random access procedure is successful. On the other hand, in case that the data including the higher identifier of its own is not transmitted to DL-SCH before the contention resolution timer is terminated, the UE determines that the random access procedure is failed.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

FIG. 12 is a diagram schematically exemplifying an attach procedure in a wireless communication system to which the present invention can be applied.

The attach procedure is used to establish connection to a network when a UE enters an E-UTRAN cell, in general. Further, the attach procedure may be used in case of handover from a non-3GPP network to E-UTRAN.

1-2. A UE initiates an attach procedure by transmitting an Attach Request message to an MME.

The Attach Request message includes the international mobile subscriber identity (IMSI) of the UE, a PDN type requested by the UE, and the like. Here, the PDN type indicates an IP version (i.e., IPv4, IPv4v6 or IPv6) requested by the UE.

The Attach Request message is delivered being included in an RRC Connection Setup Complete message through RRC connection and delivered being included in an initial UE message through S1 signaling connection.

The UE may transmit the Attach Request message along with a PDN Connectivity Request message in order to request PDN connectivity.

3. The MME requests information for UE authentication from an HSS, receives the information and performs mutual authentication with the UE.

4. The MME registers the location of the UE with the HSS and receives user subscription information (i.e., subscribed QoS profile) from the HSS in order to generate a default bearer for the UE.

Here, subscription information does not include IP address information about the UE in the case of dynamic IP address allocation but includes static IP address information allocated to the UE in the case of static IP address allocation.

5. The MME assigns a default EPS bearer ID and transmits a Create Session Request message to an S-GW.

The Create Session Request message includes the IMSI of the UE, an EPS bearer ID, a P-GW ID (i.e., P-GW address) selected by the MME for EPS bearer generation, an APN, a subscribed QoS profiled received from the HSS, a PDN type, an IP address (i.e., PDN address) of the UE, etc.

Here, the PDN type is the same as PDN type information received from the UE. The IP address of the UE may be set to 0 in the case of dynamic IP address allocation and set to static IP address information (included in subscription information) assigned to the UE in the case of static IP address allocation.

6. The S-GW assigns an S5 S-GW TEID (Tunnel Endpoint Identifier) to a P-GW included in the Create Session Request message received from the MME in order to generate an S5 bearer and transmits the Create Session Request message to the P-GW.

The Create Session Request message includes the IMSI of the UE, the EPS bearer ID, the S5 S-GW TEID, an APN, the subscribed QoS profile, the PDN type (i.e., IP version), the IP address (i.e., PDN address) of the UE, etc.

7. The P-GW assigns an IP address to be used by the UE and performs an IP connectivity access network (IP_CAN) session establishment/modification procedure with a PCRF.

Here, the P-GW may assign an IP address selected from an IP address pool thereof to the UE in the case of dynamic IP address allocation and assign the same IP address as the static IP address information (included in subscription information) allocated to the UE in the case of static IP address allocation.

8. The P-GW assigns a P-GW TEID (Tunnel Endpoint Identifier) to the S-GW in order to generate an S5 bearer and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a PDN type different from a requested PDN type, the P-GW indicates, to the UE, the reason why the PDN type has been modified together with the PDN type.

When this procedure is done, the creation of the S5 bearer is completed between the S-GW and the P-GW so that the S-GW can transmit uplink traffic to the P-GW or receive downlink traffic from the P-GW.

9. The S-GW assigns an S1 S-GW TEID in order to generate S1 bearer and transmits the Create Session Request message to the MME in response to the Create Session Request message.

The Create Session Response message includes the IMSI of the UE, the EPS bearer ID, the S1 S-GW TEID, the PDN type, the IP address (i.e., PDN address) allocated to the UE, etc.

10-11. The MME transmits an Attach Accept message to the UE in response to the Attach Request message.

The Attach Accept message includes the EPS bearer ID, an APN, the ID address (i.e., PDN address) of the UE allocated by the P-GW, PDN type, a tracking area identity (TAI) list, a TAU timer, etc.

The Attach Accept message is delivered being included in an Initial Context Setup Request message to the eNB through the S1 signaling connection.

When this procedure is done, the creation of an uplink S1 bearer is completed between the eNB and the S-GW so that the eNB can transmit uplink traffic to the S-GW.

In addition, the Attach Accept message is delivered being included in an RRC Connection Reconfiguration message from the eNB to the UE through the RRC connection.

When this procedure is done, the creation of DRB is completed between the UE and the eNB so that the UE can transmit uplink traffic to the eNB or receive downlink traffic from the eNB.

12. The eNB transmits an Initial Context Setup Response message to the MME in response to the Initial Context Setup Request message. The Initial Context Setup Response message includes an S1 eNB TEID.

13-14. The UE transmits an Attach Complete message to the MME in response to the Attach Accept message.

The Attach Complete message is delivered being included in a UL Information Transfer message through the RRC connection and delivered being included in an Uplink NAS Transport message through the S1 signaling connection.

When this procedure is done, the creation of an uplink default EPS bearer is completed between the UE and the P-GW so that the UE can transmit uplink data to the P-GW.

15. The MME delivers the S1 eNB TEID received from the eNB to the S-GW through a Modify Bearer Request message.

When this procedure is done, the creation of a downlink S1 bearer is completed between the eNB and the S-GW so that the eNB can receive downlink traffic from the S-GW.

16-17. The bearer between the S-GW and the P-GW is updated as necessary.

18. The S-GW transmits a Modify Bearer Response message to the MME in response to the Modify Bearer Request message.

When this procedure is done, the creation of a downlink default EPS bearer is completed between the UE and the P-GW so that the P-GW can transmit downlink data to the UE. That is, connection between the UE and the PDN is established and thus the UE can be provided with a PDN service using an allocated IP address.

19. The MME transmits a Notify Request message including the P-GW ID (i.e., P-GW address) and APN to the HSS as necessary.

20. The HSS stores the P-GW ID (i.e., P-GW address) and related APN and transmits a Notify Response message to the MME.

FIG. 12 is a diagram exemplifying a UE requested PDN connectivity procedure in a wireless communication system to which the present invention can be applied.

TAU (TAU Procedure)

The tracking area update (TAU) procedure is performed when the UE in the ECM-IDLE state attempts to register a new location or when the TAU timer elapses.

FIG. 13 is a diagram schematically exemplifying a periodic tracking area update procedure in a wireless communication system to which the present invention can be applied.

1-2. When the TAU timer of the UE in the ECM-IDLE state has elapsed, a periodic TAU (P-TAU) procedure for reporting the tracking area (TA) to the MME is triggered.

The UE initiates the P-TAU procedure by transmitting a TAU Request (TAU Request) message to the MME.

The TAU Request message is transferred while being included in the RRC Connection Setup Complete message in the RRC connection and transferred while being included in the Initial UE message in the S1 signaling connection.

3. The MME that receives the TAU Request message resets the TAU timer and transmits a Modify bearer request message including an E-UTRAN Cell Global Identifier (ECGI) and the TAI to the S-GW.

4-5. When the cell (ECGI) or the tracking area (TAI) in which the UE is located is changed, the S-GW transmits the Modify Bearer Request message to the P-GW to notify the change of the ECGI or TAI.

The P-GW performs an EPS session modification procedure and transmits a Modify Bearer Response message to the S-GW in response to the Modify Bearer Request message.

6. The S-GW transmits the Modify Bearer Response message to the MME in response to the Modify Bearer Request message.

7-8. The MME transmits a TAU Accept message to the UE in response to the TAU Request (TAU Request) message.

The TAU Accept message may include the TAU timer, and the like.

The TAU Accept message is transferred while being included in the downlink NAS transport message in the S1 signaling connection and transferred while being included in the DL Information Transfer message in the RRC connection.

9. The MME that completes updating the location of the UE releases the connection with the UE used for transmission/reception of the periodic TAU-related message and transmits a UE Context Release Command to the eNB in order to release the user context set in the E-UTRAN.

10. The eNB deletes the context of the UE and releases the resource allocated to the UE. Then, the eNB transmits an RRC Connection Release message to the UE to release the RRC connection with the UE.

11. The eNB transmits a UE Context Release Complete message to the MME in response to the UE Context Release Command message, whereby the S1 signaling connection between the eNB and the MME is released.

After completing such a procedure, the UE transits back to the ECM-IDLE state.

Power Saving Mode

The Power Saving Mode (PSM) is a function to minimize power consumption of the UE by defining an interval in which one UE disables access stratum (AS) operations including paging reception and mobility management as one of 3GPP release-12 (rel-12) advanced MTC (enhancements for MTC) (MTCe)) features. That is, the UE that supports the PSM agrees or receives an active time and a periodic TAU timer (P-TAU) with or from the network during attach and tracking area update (TAU).

When receiving the Active Time value from the network, in the case where the UE is switched from ECM-CONNECTED to ECM-IDLE, the UE maintains the ECM-IDLE state to receive the paging during the corresponding Active Time. Then, when the Active Time expires, the UE enters the PSM and stops all Access Stratum (AS) operations.

In addition, the MME starts an active timer with the Active Time value every time the UE enters the ECM-IDLE mode. In addition, when the active timer expires, the MME deduces that the UE is unreachable.

That is, Active Time refers to a time when the UE supporting a state (for example, the power saving mode (PSM), etc.) using a power saving function maintains the ECM-IDLE (or RRC_IDLE) state.

When the periodic TAU timer expires, the UE enables the AS operation and performs the TAU again and the network stops an implicit detach timer of the corresponding UE. The UE may wake up at any time when a user wants for a mobile originated call (e.g., uplink data packet transfer), etc.

On the contrary, for a mobile terminated call (e.g., downlink data packet receiving), etc., the UE wakes up every P-TAU period to perform the TAU and performs a paging receiving operation for the active time received at that time and thereafter, enters the PSM again to sleep.

Discontinuous Reception (DRX) Mode

In the 3GPP LTE/LTE-A system, an EPS connection management (ECM)-connected state and the ECM-IDLE state are defined in order to manage the signaling connection between the UE and the network. The ECM connected state and the ECM idle state may also be applied to the UE and the MME. The ECM connection is comprised of the RRC connection established between the UE and the eNB and the S1 signaling connection established between the eNB and the MME. The RRC state indicates whether the RRC layer of the UE and the RRC layer of the eNB are logically connected. That is, when the RRC layer of the UE and the RRC layer of the eNB are connected, the UE is in the RRC_CONNECTED state. When the RRC layer of the UE and the RRC layer of the eNB are not connected, the UE is in the RRC_IDLE state.

Herein, the RRC_CONNECTED state means a state in which the UE may receive a service on a cell basis while the UE is connected to a specific cell and the UE is managed on the cell basis.

In the RRC_IDLE state, the UE is managed by the unit of a tracking area (TA), which is a larger area unit than the cell in a state in which the UE has no connection with the eNB and only maintains a connection with the Mobility Management Entity (MME). That is, the UE in the RRC_IDLE state intermittently wakes up to monitor a paging channel (PCH) to check whether there is a paging message transmitted to the UE. That is, the UE performs discontinuous reception (DRX) set by a non-access stratum (NAS) using an ID uniquely allocated in the tracking area. The UE may receive broadcasts of system information and paging information by monitoring the paging signal at a specific paging time for each UE-specific paging DRX cycle. In addition, the UE checks whether a reception signal and when the identifier of the UE is included in the paging channel, the UE is switched to the RRC_CONNECTED mode through the service request procedure (see FIG. 12). Through such a network state definition, UE without an enabled service may minimizes power consumption thereof and the eNB may efficiently use the resources.

As described above, in order for the UE to receive A normal mobile communication service such as voice or data, the UE needs to transit to the ECM connected state. The initial UE is in the ECM idle state as in the case where the UE is first turned on and when the UE is successfully registered in the corresponding network through the initial attach procedure, the UE and the MME transit to the ECM connected state. Further, when the UE is registered in the network but the traffic is inactivated and the radio resource is not thus allocated, the UE is in the ECM idle state and when new uplink or downlink traffic is generated in the UE, the UE and the MME transit to the ECM connected state.

In the 3GPP LTE/LTE-A system, a dormant mode and an active mode are defined even in the RRC_CONNECTED state in order to minimize the power consumption of the UE.

When the UE in the RRC_CONNECTED state does not have data to be transmitted/received for a predetermined time, the cell connection is just maintained and the UE may enter the dormant mode. The UE in the dormant mode intermittently wakes up to monitor the physical control channel in order to receive data which may be transmitted thereto.

As described above, in order to minimize the power of the UE, the wireless communication system uses a discontinuous reception (DRX) technique of the UE.

The DRX defined in the 3GPP LTE/LTE-A system may be used both in the dormant mode and in the RRC_IDLE state of the UE and the DRX technique used for each state is as follows.

1) Dormant mode in RRC_CONNECTED state
Short DRX: short DRX cycle (2 ms~640 ms)
Long DRX: long DRX cycle (10 ms~2560 ms)
2) RRC_IDLE state
Paging DRX: paging DRX cycle (320 ms~2560 ms)

The UE may perform monitoring of the PDCCH based on RNTI (e.g., C-RNTI, SI-RNTI, P-RNTI, etc.) which is a unique identifier of the UE.

The monitoring of the PDCCH may be controlled by the DRX operation and the parameter related to the DRX is transmitted to the UE by the RRC message. In particular, the UE needs to continuously receive the SI-RNTI, the P-RNTI, etc., regardless of the DRX operation configured by the RRC message. Herein, the remaining PDCCHs other than the PDCCH scrambled with the C-RNTI are continuously received through a common search space of a primary serving cell (e.g., P cell).

When the DRX parameter is configured in the state where the UE is the RRC connected state, the UE performs discontinuous monitoring of the PDCCH based on the DRX operation. On the contrary, when the DRX parameter is not configured, the UE performs continuous PDCCH monitoring.

That is, the UE searches for the PDCCH by performing blind decoding in a UE-specific search space in a PDCCH region based on the DRX operation. When the UE does not detect a CRC error at the time of unmasking the CRC of the PDCCH using the RNTI, the UE determines that the corresponding PDCCH transfers control information thereof.

The discontinuous PDCCH monitoring means that the UE monitors the PDCCH only in a predetermined specific subframe and the continuous PDCCH monitoring means that the UE monitors the PDCCH in all subframes. Meanwhile, when PDCCH monitoring is required in a DRX-independent operation such as a random access procedure, the UE monitors the PDCCH according to the requirement of the corresponding operation.

Further, as described above, the UE receiving the paging message may perform the DRX for the purpose of reducing the power consumption.

To this end, the network configures a plurality of paging occasions for each time cycle called a paging cycle and a specific UE receives the paging message only at a specific paging time, and the UE does not receive the paging channel at occasions other than the specific paging occasion. Further, one paging occasion may correspond to one TTI.

The extended idle mode DRX (eDRX: extended DRX) increases the existing maximum 2.56 s paging DRX cycle to several minutes to several tens of minutes to minimize the power consumption of the UE. The eDRX may be applied to the idle mode and the connected mode. The extended idle mode DRX applied to the connected mode is relatively shorter than the DRX applied in the idle mode, such as up to 10.24 s.

In the case of the UE supporting the eDRX mode, an unreachable state of the UE may mean an unreachable state (i.e., a DRX period in which the UE does not monitor the paging channel) due to paging.

On the contrary, in the case of the UE supporting the eDRX mode, a state in which the UE is reachable may mean the ECM-CONNECTED mode and/or a state in which the UE is immediately reachable by paging (i.e., a period in which the UE monitors the paging channel).

In other words, it may be determined that the eDRX is temporarily unreachable even the idle period because the eDRX period is relatively longer than the normal DRX period. In other words, data may be delivered up to 2.56 seconds after normal DRX (2.56 seconds) is supported, but when the eDRX (e.g., 10 minutes) is applied, the maximum delay is 10 minutes, and as a result, immediate data delivery is unavailable and the unavailable data delivery may be regarded as substantially unreachable.

The UE and the network may negotiate the use of the extended idle mode DRX through NAS signaling to reduce the power consumption of the UE. The UE applying the extended idle mode DRX may use mobile terminating data and/or a network originated procedure within a delay of a specific time depending on the DRX cycle value.

The UE that desires to use the extended idle mode DRX (in particular, a UE side application) needs to specially control a mobile terminating service or data delivery and in particular, the corresponding UE needs to consider delay tolerance of the mobile terminating data. The network (in particular, a network side application) may transmit the mobile terminating data, SMS or device trigger and needs to know whether the extended idle mode DRX is ready. The UE needs to the extended idle mode DRX only in the case where all expected mobile terminating communication is tolerant to the delay.

In order to negotiate the use of the extended idle mode DRX, the UE requests extended idle mode DRX parameters during the Attach procedure and the RAU/TAU procedure. The SGSN/MME may reject or accept the request of the UE for the extended idle mode DRX. When the SGSN/MME accepts the extended idle mode DRX, the SGSN/MME may provide a value different from the extended idle mode DRX parameter requested by the UE based on an operator policy. When the SGSN/MME accepts the use of the extended idle mode DRX, the UE applies the extended idle mode DRX based on the received extended idle mode DRX parameters. When the SGSN/MME rejects the request or when the UE does not receive the extended idle mode DRX parameter within the associated accept message due to reception of the request by the SGSN/MME which does not support he extended idle mode DRX, the UE applies the existing DRX.

When the UE requests both the power saving mode (PSM) (active time and/or periodic TAU timer (T-PAU) request) and the extended idle mode DRX through the NAS, the SGSN/MME may make a determination as follows.

Enabling the PSM only (i.e., rejecting the request for the extended idle mode DRX)

Enabling the extended idle mode DRX only (i.e., rejecting the request for the active time)

Enabling both the PSM (i.e., providing the active time) and the extended idle mode DRX (i.e., providing the extended idle mode DRX parameters)

When one of the three is determined and the associated parameters (i.e., active time, P-TAU timer, and/or extended idle mode DRX cycle value) are provided to the terminal, the next Attach or RAU/TAU procedure is initiated and is used until any one of the three is newly determined. If both the extended idle mode DRX and the PSM are enabled, the extended idle mode DRX cycle may be set to have the plurality of paging occasions while the active timer is driven.

If the PSM active time provided by the UE is greater than the extended idle mode DRX cycle, the SGSN/MME may enable both the PSM and the extended idle mode DRX. This may minimize the power consumption of the UE during the active time.

Machine-Type Communication (MTC)

FIG. 14 is a diagram exemplifying a machine-type communication (MTC) architecture in a wireless communication system to which the present invention can be applied.

An end-to-end application between the UE (or MTC UE) used for the MTC and an MTC application may adopt services provided in the 3GPP system and the optional services provided to an MTC server. The 3GPP system may provide transport and communication services (including 3GPP bearer services, IMS, and SMS) including various optimizations to facilitate the MTC.

FIG. 14 illustrates that the UE used for the MTC is connected to a 3GPP network (UTRAN, E-UTRAN, GERAN, I-WLAN, etc.) through an Um/Uu/LTE-Uu interface. The architecture of FIG. 14 includes various MTC models (Direct, Indirect, and Hybrid models).

First, entities illustrated in FIG. 14 will be described.

In FIG. 14, the application server is a server on the network where the MTC application is executed. Techniques for implementing various MTC applications described above may be applied to the MTC application server and a detailed description thereof will be omitted. Further, in FIG. 14, the MTC application server may access the MTC server through a reference point API, and a detailed description thereof will be omitted. Alternatively, the MTC application server may be collocated with the MTC server.

The MTC server (e.g., an SCS server in FIG. 14) is a server on the network that manages the MTC terminal and may communicate with the UE and PLMN nodes connected to the 3GPP network and used for the MTC.

An MTC-interworking function (MTC-IWF) may manage interworking between the MTC server and an operator core network and act as a proxy for the MTC operation. In order to support an MTC indirect or hybrid model, the MTC-IWF may relay or interpret a signaling protocol on a reference point Tsp to enable a specific function in the PLMN. The MTC-IWF performs a function of authenticating the MTC server before the MTC server establishes communication with the 3GPP network, a function of authenticating a control plane request from the MTC server, various functions related to a trigger instruction described later, etc.

Short Message Service-Service Center (SMS-SC)/Internet Protocol Short Message GateWay (IP-SM-GW) may manage transmission and reception of the short message service (SMS). The SMS-SC may be responsible for relaying, storing, and delivering short messages between a short message entity (SME) (an entity transmitting or receiving short messages) and the UE. The IP-SM-GW may take charge of protocol interoperability between a IP-based UE and the SMS-SC.

Charging data function (CDF)/charging gateway function (CGF) may perform charging-related operations.

The HLR/HSS may serve to store subscriber information (IMSI, etc.), routing information, configuration information, etc., and provide the subscriber information (IMSI, etc.), routing information, configuration information, etc., to the MTC-IWF.

The MSC/SGSN/MME may perform control functions including mobility management, authentication, resource allocation, etc., for network connection of the UE. The MSC/SGSN/MME may perform a function of receiving the trigger instruction from the MTC-IWF and processing the received trigger instruction in the form of the message to be provided to the MTC UE in association with the triggering described later.

The gateway GPRS support node (GGSN)/serving-gateway (S-GW)+packet date network-gateway (P-GW) may perform a gateway function of taking charge of connection between a core network and an external network.

In Table 2, main reference points in FIG. 14 are summarized.

TABLE 2

| Reference point | Description |
|---|---|
| Tsms | Reference point used for an entity outside the 3GPP system to communicate with the MTC UE via the SMS |
| Tsp | Reference point used for the entity outside the 3GPP system to communicate with the MTC-IWF in association with control plane signaling |
| T4 | Reference point used by the MTC-IWF to route device triggers to the SMS-SC of the HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire identification information (E.164 Mobile Station International Subscriber Directory Number (MSISDN) or IMSI mapped to an external identifier) of the UE and to collect UE accessibility and configuration information |

In Table 2, at least one of the reference points T5a, T5b, and T5c is referred to as T5.

Meanwhile, user plane communication with the MTC server in the case of the indirect and hybrid models and communication with the MTC application server in the case of the direct and hybrid models may be performed using the existing protocol through the reference points Gi and SGi.

Specific details related to the contents described in FIG. 14 may be incorporated into the present document by reference of 3GPP TS 23.682 document.

FIG. 15 exemplifies an architecture for service capability exposure in a wireless communication system to which the present invention can be applied.

The architecture for the service capability exposure illustrated in FIG. 15 illustrates that the 3GPP network securely exposes services and capabilities thereof provided by the 3GPP network interface to an external third party service provider application.

A service capability exposure function (SCEF) is a core entity within the 3GPP architecture for the service capability exposure that provides a means for securely exposing the services and capabilities provided by 3GPP network interface. In other words, the SCEF is a key entity for providing service functions belonging to a trust domain operated by a mobile communication provider. The SCEF provides API interfaces to third party service providers and provides 3GPP service functions to third party service providers through connections with various entities of 3GPP. The SCEF may be provided by the SCS.

When a Tsp function may be exposed through the application program interface (API), the MTC-IWF may be co-located with the SCEF. A protocol (e.g., DIAMETER, RESTful APIs, XML over HTTP, etc.) is selected to specify a new 3GPP interface depending on multiple factors and herein, the multiple factors include facilitation of exposure of requested information, and need of a specific interface, but is not limited thereto.

Cell Selection

1) Initial Cell Selection

When the UE is turned on or does not find any suitable cell by a cell reselection procedure, cell selection starts.

A general procedure for initial cell selection is as follows.

First, the UE performs a cell search procedure at a single carrier frequency and finds all cells at the corresponding frequency. Then, a cell measurement is performed in each cell and a cell having the strongest (that is, a highest measured value) at the carrier frequency is found.

Next, the UE reads system information for the strongest cell at the carrier frequency. When the cell is a suitable cell, the UE attempts to camp on the cell.

When the UE successfully camps on the cell, the UE stops searching at other carrier frequencies. Otherwise, the UE needs to sequentially search for the strongest cell at the next carrier frequency.

2) Stored Information for Cell Selection

When the UE stores information on a specific cell, the UE does not need to start with the initial cell selection procedure, but instead may perform the cell selection using stored information. When no suitable cell is found in accordance with the stored information, the initial cell selection procedure is then initiated.

Cell Reselection

During camping on the cell, the UE may find a better cell based on a measurement rule. When the better cell is found according to cell reselection criteria, the corresponding cell is selected.

1) Measurement for Cell Reselection

Measurement includes both a serving cell and a neighbor cell(s).

Measurement in the serving cell

When the power save mode (PSM) is used, the measurement at the serving cell is performed when the UE wakes up. When the DRX (or eDRX)/paging is used, the measurement is performed in each paging cycle.

Measurement in the neighbor cell

Neighbor cell measurement need not be performed periodically to reduce the power consumption in the UE. Alternatively, the UE may initiate the neighbor cell measurement when a received signal level of the serving cell is below a criterion or several-time decoding fails.

2) Cell Reselection Criteria

After the measurement of the neighbor cell, the UE ranks all cells and reads required system information of a cell having a highest priority. When the cell is suitable for camping and the following reselection condition is satisfied, the UE reselects the corresponding cell.

Case where a new cell has a higher priority than the serving cell during a T_reselection time interval (during the interval, the UE needs to measure the serving cell and the neighbor cell.). Herein, the timer value may be broadcasted within the system information.

Case where the UE currently camps on the serving cell during a defined period

When an optimal cell is not a suitable cell, the UE may reselect a second optimal cell.

Tracking Area Identity (TAI)

The UE receives a Tracking Area Identity (TAI) list from the MME through Attach and Tracking Area Update (TAU). Whenever the serving cell is changed, the UE performs the TAU when a tracking area code (TAC) (and/or TAI) of the changed cell does not belong to the TAI list of the UE.

The TAI is defined as follows.

FIG. 16 is a diagram exemplifying a tracking area identifier in a wireless communication system to which the present invention can be applied.

The TAI is the identity used to identify tracking areas. The TAI is constituted by a mobile country code (MCC), a mobile network code (MNC), and a tracking area code (TAC).

This is the identity used to identify tracking areas. The is constructed from the MCC (Mobile Country Code, MNC (Mobile Network Code) and TAC (Tracking area code).

The TAI is associated with a single time zone. All TAIs serviced by one base station needs to be included in the same time zone.

When the serving cell is changed, the RRC layer of the UE acquires the system information transmitted from the eNB. Then, system information block type 1 is read to transfer the tracking area code is transmitted to a higher layer.

The relationship between the TAI and the TAC is as follows. The cell/eNB belongs to one TAC and the TAC/TAI may be comprised of one or more cells.

The cell broadcasts only one TAI/TAC. A mapping relationship between the corresponding TAI/TAC and the eNB/cell is defined as operation and maintenance (O & M) and recognized by MME.

Cellular Internet of Things (IoT) (CIoT)

Cellular IoT (CIoT) refers to IoT using cellular wireless communication technology (e.g., 3GPP technology). In addition, CIoT RAT means radio access technology supporting the CIoT.

The evolution of an radio access network (RAN) and the evolution of a core network (CN) for CIoT services are discussed together.

In the case of the RAN, two types of CIoTs are discussed. One of them is a GERAN evolutionary solution (e.g., Extended Coverage-GSM (EC-GSM)) and the other one which is a new radio access network type called Clean Slate solution (e.g., Narrow Band CIoT or NB-LTE) is discussed.

CIoT EPS optimization supports enhanced small data transfer. One optimization is based on User Plane transport of user data and is referred to as user plane CIoT EPS optimization. In another optimization known as Control Plane CIoT EPS Optimization, the user data is encapsulated to an NAS packet data unit (PDU) to transfer the user data through the MME, and as a result, the total number of control plane messages may be reduced at the time of controlling short data transaction. CIoT data includes, for example, status information, measurement data, and the like generated from the M2M application.

The CIoT EPS Optimization is designed to support both Narrow Band (NB)-IoT RAT and MTC Category M1, but may separately handle individual RATs. That is, the MME/NAS may perform different processing through which RAT the UE is serviced.

Regardless of which wireless access solution is selected, a cellular system may require the following requirements to support ultra low and low throughput IoT.

a) The reuse of existing Core Network (CN) features to reduce UE energy consumption (e.g., Rel-12 Power Save Mode (PSM) and Rel-10's long term periodic routing area update (RAU)/tracking area update (TAU) timer)

b) Supporting network sharing (full-multi operator core network (Full-MOCN) and gateway core network (GWCN)

c) Supporting a mechanism for controlling MTC device access on a PLMN basis (e.g., an equivalent mechanism to the existing PLMN-specific access class barring mechanism)

d) supporting the short message service (SMS)

e) Supporting IP header compression and IP-based service f) Supporting autonomous cell selection/reselection based mobility support of the UE (both the connected state and the idle state). Network controlled mobility with UE measurement reporting is not required.

g) Supporting a broadcast mechanism (e.g., supporting Broadcast Multicast Service (MBMS), Public Warning System (PWS), and Cell Broadcast Service (CBS)).

h) Based on the Gb architecture, it is required to support the introduction of operation and maintenance (O & M) procedures equivalent to an "S1 setup" procedure.

CIoT is suitable for an environment with limited mobility such as smart metering and smart city and is also designed for minimizing the UE power consumption to operate without battery charging for a long time.

Accordingly, according to the requirements of the cellular system described above, mobility without network control is basically performed and a measurement report procedure may be omitted in order to minimize the power consumption of the UE.

In addition, in the case of the IoT, since a large number of IoT UEs use limited resources (assuming a maximum of 40 UEs per household), there is a high possibility that overload of the paging resource will occurs (it is assumed that the CIoT uses the narrow band).

Therefore, in the normal UE, the paging is transmitted to a plurality of cells belonging to the corresponding TA based on the tracking area (TA). However, in the case of the IoT device, the paging may be transmitted to lasted (or most recently) known cell or last serving cell in which the UE last stays by considering no mobility (stationary) or low mobility.

Accordingly, in 3GPP, a discussion has been started to transmit the paging to the last known cell as follows for paging resource optimization (i.e., a radio resource and an S1 interface resource (resource between the eNB and the MME)).

FIG. 17 is a diagram exemplifying an example of a paging method in a wireless communication system to which the present invention can be applied.

Referring to FIG. 17, in the case where the cells are overlapped, there is a possibility that the UE will reselect from cell A currently camped by a surrounding environment to cell B in spite of no mobility.

To this end, the eNB may transmit serving cell and overlapping cell information together to the MME with measurement report information of the UE when the UE is switched from the ECM-Connected state to the ECM-Idle state (S1 release). Accordingly, the MME transmits the paging to both the serving cell and the reported overlapped cell, and as a result, the UE is successfully enabled to receive the paging even when reselecting cell B.

Method for Managing Paging area/Location Area of UE

Hereinafter, the present invention proposes a paging location management method of CIoT radio access technology (RAT).

That is, the present invention proposes a method for providing accurate cell information (e.g., the change of the serving cell when the UE is in the idle mode) to the CN so as to limit only a cell(s) where the UE actually exists in the core network (CN). In particular, the "cell based area update" procedure proposed by the present invention may be applied to no mobility/low mobility UE(s) based on negotiation between the UE and the CN (e.g., MME).

The CIoT UE may be distinguished into a no mobility (low mobility) or low mobility UE and a mobility UE.

Such a UE type may be used as a criterion for distinguishing whether to support cell based location management (i.e., cell based area update) or location area based location management (i.e., location area based area update) (e.g., the tracking area or the routing area) which is a relatively wide range.

That is, in the case of the no mobility or low mobility UE, the cell based location management may be supported. On the contrary, in the case of the mobility terminal, the location (e.g., the tracking area or the routing area) based location management may be supported.

To this end, the UE may negotiate whether to use the cell based location management or the location area based location management with the network during the attach and the location area update (e.g., tracking area update (TAU) or routing area update (RAU)) to the network.

When the UE is recognized as no mobility/low mobility due to subscription information and pre-configured information, the UE may request the cell based location management by transmitting a corresponding capability to the network during the attach and/or location area update to the network in order to use the cell based location management.

The network (e.g., MME/SGSN) may determine the user of the cell based location management or location area based location management by using a network capability (the use of the paging resource, etc.) and transmit the determined use to the UE.

When a paging resource situation (i.e., the paging resource of a radio interval and the paging resource of CN and eNB intervals) is sufficient, the network may command the location area based location management even when the UE requests the cell based location management (or instructs the capability of the UE).

In this case, a paging transmission error may be minimized because the paging is transmitted to a large range of location area (e.g., the tracking area or the routing area) to which the UE belongs. In addition, since the UE does not need to report the change of the cell to the network when changing the cell, there is an advantage that no additional signaling is required.

On the contrary, when the paging resources are insufficient, the network may command the cell based location management to the UE. Accordingly, an effect of minimizing the number of areas and eNBs that transmit the paging in the CN and the number of cells belonging to the eNB may be obtained.

When the UE is instructed to perform the cell based location management from the network, in the case where the cell (that is, a cell selected by cell (re)selection, etc.) on which the UE camps is changed instead of the location area update (e.g., tracking area update or routing area update) during the idle mode interval), the UE may notify the change of the cell to the MME/SGSN. That is, when the cell based location management is configured, in the case where when the camped cell is different from the cell previously reported to the network, the access stratum (AS) of the UE performs the location area update in order to notify the case to the network.

In this case, it is possible to follow a procedure similar to the existing tracking area may be followed or a new message, etc. may be used. However, even in this case, when the tracking area to which the UE belongs is changed, the tracking area update is performed to update the change of the tracking area to report the changed tracking area to the network. In the case of performing the cell based location area update, the UE may directly indicate a cell identifier (ID) or the eNB may make the cell ID and an eNB identifier (ID) be included in the RRC message in which the NAS message is encapsulated together and report the identifiers to the CN.

In addition, in the case where the UE performs the cell based location area update, when it is determined that the cell is frequently changed like a case where the UE exists in an overlapping region, the UE may report a changeable candidate cell list to the network together. That is, the UE may report the cell list for the cell considered to be overlapped and/or a cell that reselection is possible to the network together in addition to the camping cell.

In this case, the number (for example, X) of cells reported by the UE may be limited to a number smaller than N configured by the network or designated as a default value. In this case, the UE may not perform cell based location area report when the UE reports X cells together in the location report and then moves within the reported X cells.

Accordingly, it is possible to prevent frequent location area report which may occur when the cell is changed without movement of the UE (for example, in the case of the overlapped cell, the camping cell of the UE may be changed due to an influence of surrounding interference, etc.). In addition, when the UE has a low mobility characteristic, after initial power is up, a trajectory of the UE is determined in the higher layer of the UE and thereafter, a limited cell list (i.e., a cell list in which the UE is expected to move) in which the UE moves may be extracted by using the determined trajectory. Then, the UE transmits the extracted cell list included in the attach request message and/or tracking area update (TAU) request message to the network or transmit the extracted cell list included in the cell based location update message which may be used for the cell based location management to the network. Thereafter, when the UE moves within the corresponding cell list, an additional cell based location update may not be performed.

Further, this may be possible only when the network terminal confirms the corresponding cell list. That is, only when the cell list transmitted by the UE is confirmed by the network, the additional cell based location update may not be performed when the UE moves within the corresponding cell list.

When the UE is configured to the cell based location management and the UE reports only one cell, the CN node such as the MME/SGSN may transmit the paging only to the reported cell (or base station of the cell). In addition, when X cell lists (or eNB list) other than the cell on which the UE camps are together reported, the MME/SGSN may transmit the paging to the corresponding cell(s) (or eNB(s)).

In this case, when the MME/SGSN may not receive a response to the paging from the UE (e.g., may not receive the service request message from the corresponding UE) after transmitting the paging to a last known reported cell (and additionally reported cell), the MME/SGSN may set the cell based location management of the corresponding UE to perform the location area based location management again.

In addition, when a periodic location area update period expires, if the cell based location management is set, the UE may transmit the cell information comprised of the cell ID and/or the eNB ID to the network node. Alternatively, as described above, the eNB may transmit the cell ID and/or the eNB ID included in the RRC message in which the NAS message is encapsulated to the network node together. In this case, the tracking area (or routing area) information may also be reported to the network.

Further, when the UE does not move any longer or the overlapping cell is not recognized, the UE may report only the camping cell other than the neighbor cell to the network. In this case, the MME/SGSN may then transmit the paging only to the corresponding cell when transmitting the paging to the corresponding UE.

Hereinafter, a method for determining the cell-based area update will be described in more detail with reference to the drawings.

Hereinafter, in the description of the present invention, the CIoT RAT may correspond to the RAT separately configured for the CIoT UE or may correspond to the eNB.

FIG. 18 is a diagram exemplifying a method for determining a cell-based area update according to an embodiment of the present invention.

Referring to FIG. 18, the UE may determine the use of the cell based area update (S1801).

Herein, the UE may determine whether to use the cell-based area update procedure based on subscription information (e.g., configured to a stationary UE) or trajectory information previously configured or evaluated by the UE.

When a space of movement for the UE with the low mobility is limited to a few cells, the UE may decide to use the cell based update procedure.

Meanwhile, when the corresponding UE is predetermined to use the cell based area update by the subscription information (e.g., configured to the stationary UE) of the UE, step S1801 in which the UE determines whether to use the cell based area update may be omitted.

The UE may indicate (transmit) the cell based area update capability to the MME during the Attach/TAU procedure (S1802).

For example, the UE may transmit the Attach Request message (NAS message) or TAU Request message (NAS message) indicating (or including) the cell based area update capability to the MME.

When the UE indicates the cell based area update capability, the MME may determine whether to allow the UE to update the cell based area (S1803).

Herein, the MME may determine whether to apply the cell based area update procedure to the corresponding UE based on the subscription information of the corresponding UE and/or a load condition of a current paging resource (i.e., the paging resource of the radio interval and the paging resource of the S1 interval) (applicability).

For example, when the paging resources are sufficient, the MME may not need to accept the use of the cell based area update.

When the MME accepts the cell based area update procedure of the UE, the MME may instruct (transmit) the cell based area update acceptance to the UE during the Attach/TAU procedure (S1804).

For example, the UE may transmit the Attach Accept message (NAS message) or TAU Accept message (NAS message) indicating (or including) the cell based area update acceptance to the MME.

The UE performs the cell based area update procedure (S1805).

That is, the UE applying the cell based area update may report the change of the serving cell to the CN (e.g., MME) when the serving cell is changed while the UE is in the idle mode.

The cell based area update will be described below in more detail.

According to another embodiment of the present invention, when the MME accepts the cell based area update procedure of the UE, the MME may optionally cause multi-cells to be reported as an 'additional cell (or paging area)'. This will be described in more detail with reference to drawings given below.

FIG. 19 is a diagram exemplifying a method for determining a cell-based area update according to an embodiment of the present invention.

Referring to FIG. 19, the UE may determine the use of the cell based area update (S1901).

Herein, the UE may determine whether to use the cell-based area update procedure based on subscription information (e.g., configured to the stationary UE) or trajectory information previously configured or evaluated by the UE.

When the space of movement for the UE with the low mobility is limited to a few cells, the UE may decide to use the cell based update procedure.

Meanwhile, when the corresponding UE is predetermined to use the cell based area update by the subscription information (e.g., configured to the stationary UE) of the UE, step S1901 in which the UE determines whether to use the cell based area update may be omitted.

The UE may indicate (transmit) the cell based area update capability to the MME during the Attach/TAU procedure (S1902).

For example, the UE may transmit the Attach Request message (NAS message) or TAU Request message (NAS message) indicating (or including) the cell based area update capability to the MME.

Further, the UE may report an additional cell together with the serving cell in the Attach Request message (NAS message) or TAU Request message (NAS message). Herein, the additional cell may be comprised of neighbor cells except for the serving cell.

When the UE indicates the cell based area update capability, the MME may determine whether to allow the UE to update the cell based area (S1903).

Herein, the MME may determine whether to apply the cell based area update procedure to the corresponding UE based on the subscription information of the corresponding UE and/or a load condition of a current paging resource (i.e., the paging resource of the radio interval and the paging resource of the S1 interval) (applicability).

For example, when the paging resources are sufficient, the MME may not need to accept the use of the cell based area update.

When the MME accepts the cell based area update procedure of the UE, the MME may instruct (transmit) the cell based area update acceptance to the UE during the Attach/TAU procedure (S1904).

For example, the UE may transmit the Attach Accept message (NAS message) or TAU Accept message (NAS message) indicating (or including) the cell based area update capability to the MME.

In this case, when the MME accepts the cell based area update procedure of the UE, the MME may provide a maximum cell number (Max_Cell_N) value which is an optional parameter. The maximum cell number (Max_Cell_N) value may indicate the maximum number of additional cells (or paging areas) that the UE reports when performing the cell based area update procedure. That is, it is possible to prevent frequent cell change reports from the UE by allowing the UE to report the additional cells within a range of the maximum cell number (Max_Cell_N).

Alternatively, the maximum cell number (Max_Cell_N) value may be configured to default or may be configured to the UE in advance through the system information, or the like.

The UE performs the cell based area update procedure (S1905).

In this case, the UE may derive the additional cells and report the additional cells together with the serving cells during the cell based area update procedure. Herein, the additional cell may be comprised of the neighbor cells except for the serving cell.

In addition, the number of neighboring cells comprising the additional cell may not exceed Max_Cell_N.

Further, the additional cells may not overlap with the cell(s) for the stationary UE or a limited mobility area for the UE with the low mobility.

A method for deriving a cell list for the additional cells is shown in Table 3 below.

TABLE 3

| Mobility | Cell change characteristic | Method according to the present invention |
|---|---|---|
| No | The serving cell may be changed due to the environmental condition being changed (e.g., blocked by a new building or the load state is changed). | When the UE detects overlapped cells, the overlapped cells may be included in the additional cells (or paging areas). |
| Low | The UE may only move within a limited area/trajectory within many cases. | When the area is limited (e.g., limited to a few cells), the additional cells (or paging areas) may be derived based on the trajectories of a few cells. |

As shown in Table 3, in the case of the no mobility UE, when the overlapping cell with the serving cell is detected, the overlapping cell may be included in the additional cell. On the contrary, in the case of the low mobility UE, the additional cell may be derived based on a predetermined area or a limited area detected by the UE.

When the UE applying the cell based area update is out of a previously reported 'serving cell and additional cell' during the idle mode (i.e., the serving cell is changed to a cell other than the 'serving cell and additional cell'), the UE performs the cell based area update procedure to report the change of 'the serving cell and the additional cell' to the CN (e.g., MME). On the contrary, when the UE moves within the previously reported 'serving cell and additional cell', the UE may not perform the cell based area update procedure.

In this case, in the case where only the cell based area update capability is transmitted to the MME in the Attach procedure or the TAU procedure, when the serving cell is changed while the UE is in the idle mode, the cell based area update procedure may be performed. In addition, the 'serving cell and additional cell' may be reported to the network in the cell based area update procedure. Thereafter, when the UE is out of the 'serving cell and additional cell' previously reported during the idle mode, the cell based area update procedure may be performed.

Alternatively, in the case where the additional cell is reported together with the serving cell in the Attach Request message or the TAU Request message in step S1902 above, when the UE is out of the 'serving cell and additional cell' reported in the Attach/TAU procedure while the UE is in the idle mode, the cell based area update procedure may be performed. Thereafter, similarly, when the UE is out of the 'serving cell and additional cell' previously reported during the idle mode, the cell based area update procedure may be performed.

Further, the MME may configure a paging cell (or paging cell list) using serving cell (or 'paging area and additional cell') information received in the cell based area update procedure (or in the Attach/TAU procedure). In addition, the paging may be transmitted to the corresponding UE by using the corresponding cell(s) information until the UE updates the serving cell (or 'paging area and additional cell') again (i.e., until the UE is out of the serving cell (or paging area and additional cell previously reported) and performs the cell based area update procedure again). That is, the MME may transmit the paging in the cell corresponding to the paging cell (or the paging cell list) when transmitting the paging to the corresponding UE.

Even when the cell based area update is not used, the UE may report the overlapping cell(s) information to the network in the TAU. Accordingly, the MME may utilize the cell information received by the TAU when transmitting the paging to the corresponding UE. That is, when the MME transmits the paging to the corresponding UE, the MME may transmit the paging through the cell received in the TAU as well as the cell in the tracking area to which the corresponding UE belongs.

Another embodiment of the present invention proposes a method for supporting efficient paging area management for CIoT.

According to an embodiment of the present invention, by providing accurate cell information (i.e., the change of the serving cell of the UE in the idle mode) to the CN, the CN may limit the paging area only to a cell(s) where the UE resides.

The UE applying the cell based area update proposed in the present invention may report the change of the serving cell to the network while the UE is in the idle mode.

That is, when the UE enters a new cell (i.e., the change of the serving cell) belonging to the TA of the UE, the UE may perform the cell based area update procedure.

On the contrary, when the UE enters a new cell (i.e., the change of the serving cell) which does not belong to the TA of the UE, the UE may perform the TAU procedure. In this case, the paging area may be initialized to the serving cell.

When the periodic TAU timer expires, the UE performs the periodic TAU procedure, but the previously stored paging area may be maintained in both the UE and the CN. The periodic TAU timer of the UE may be restarted upon completion of the cell based area update procedure (or periodic TAU procedure).

In order to prevent the cell based area update procedure from being performed frequently, the UE may report an additional cell list (e.g., overlapping cell) depending on the network configuration.

FIG. 20 is a diagram exemplifying a method for determining a cell-based area update according to an embodiment of the present invention.

Referring to FIG. 20, the UE may indicate (transmit) the cell based area update capability to the MME during the Attach/TAU procedure (S2001).

For example, the UE may transmit the Attach Request message (NAS message) or TAU Request message (NAS message) indicating (or including) the cell based area update capability to the MME.

When the UE indicates the cell based area update capability, the MME may determine whether to allow the UE to update the cell based area (S2002).

Herein, the MME may determine whether to apply the cell based area update procedure to the corresponding UE based on the subscription information (e.g., stationary/no mobility UE) of the corresponding UE and/or a load condition of a current paging resource (i.e., the paging resource of the radio interval and the paging resource of the S1 interval) (applicability).

For example, when the paging resources are sufficient, the MME may not need to accept the use of the cell based area update.

When the MME accepts the cell based area update procedure of the UE, the MME may instruct (transmit) the cell based area update acceptance to the UE during the Attach/TAU procedure (S2003).

For example, the UE may transmit the Attach Accept message (NAS message) or TAU Accept message (NAS message) indicating (or including) the cell based area update capability to the MME.

In this case, when the MME accepts the cell based area update procedure of the UE, the MME may provide a maximum cell number (Max_Cell_N) value which is an optional parameter. The maximum cell number (Max_Cell_N) value may indicate the maximum number of additional cells (or paging areas) that the UE reports when performing the cell based area update procedure. That is, it is possible to prevent frequent cell change reports from the UE by allowing the UE to report the additional cells within a range of the maximum cell number (Max_Cell_N).

Alternatively, the maximum cell number (Max_Cell_N) value may be configured to default or may be configured to the UE in advance through the system information, or the like.

Further, in step S2003, the MME sets the paging area of the corresponding UE after instructing (transmitting) the cell based area update acceptance to the UE or simultaneously with transmission of the cell based area update acceptance.

That is, in the example of FIG. 20, the paging area may be configured as a last serving cell of the UE.

The UE performs the cell based area update procedure (S2004).

That is, the UE applying the cell based area update may report the change of the serving cell to the CN (e.g., MME) when the serving cell is changed while the UE is in the idle mode. As such, when the Attach/TAU procedure is successfully completed, the paging area may be configured as the serving cell. Accordingly, the MME may transmit the paging to the corresponding UE in the paging area configured as the serving cell until the cell based area update procedure of the UE is performed.

Meanwhile, differently from the example of FIG. 20, the UE may report the additional cell together with the serving cell in the Attach Request message (NAS message) or TAU Request message (NAS message). In this case, when the UE is out of the 'serving cell and additional cell' previously reported during the idle mode, the cell based area update procedure may be performed. Further, in this case, in step S2003, the paging area may be comprised of the serving cell and the additional cell. Accordingly, the MME may transmit the paging to the corresponding UE in the paging area set as the serving cell and the additional cell until the cell based area update procedure of the UE is performed.

Hereinafter, the cell based area update procedure of the UE will be described in more detail with reference to the drawings.

FIG. 21 is a diagram exemplifying a cell-based area update procedure according to an embodiment of the present invention.

The cell based area update procedure illustrated in FIG. 21 may be performed when a specific condition (e.g., when the UE enters a new cell, not the paging area) is satisfied before the paging occasion of the UE is satisfied.

Referring to FIG. 21, when the UE enters a cell which belongs to the tracking area of the UE and does not belong to the paging area of the UE, the cell based area update procedure may be triggered by the UE (S2101).

The UE transmits a Cell Update Request message to the MME (S2102).

Herein, the Cell Update Request message may include the UE identifier and the serving cell identifier.

Alternatively, the Cell Update Request message may include only the UE identifier, and the eNB may transmit the RRC message in which the NAS message (i.e., Cell Update Request message) is encapsulated, which includes the cell identifier (Cell id) to the network node.

Further, when the UE detects the overlapping cell (i.e., a case where the strength of a radio signal is greater than a given threshold) and/or receives the maximum cell number (Max_Cell_N) value from the network (see FIG. 19 or 20 above), the additional cell(s) (e.g., overlapping cell) may be included in the Cell Update Request message. In this case, the additional cell(s) do not exceed the maximum cell number (Max_Cell_N).

The MME constructs the paging area based on information in the cell update request message of the UE (S2103).

In this case, when the additional cell(s) is included in the cell update request message, the MME may construct the paging area with the last (i.e., most recent) serving cell and the additional cell(s).

On the contrary, differently from the example of FIG. 21, when the additional cell(s) is not included in the cell update request message, the MME may construct the paging area with the last (i.e., most recent) serving cell.

The MME transmits a Cell Update Accept message to the UE (S2104).

When the UE receives the Cell Update Accept message, the UE constructs the paging area (or cell update area) (S2105).

In this case, when the additional cell(s) is included in the cell update request message, the UE may construct the paging area (or cell update area) with the last (i.e., most recent) serving cell and the reported additional cell(s).

On the contrary, differently from the example of FIG. 21, when the additional cell(s) is not included in the cell update request message, the UE may construct the paging area (or cell update area) with the last (i.e., most recent) serving cell.

In addition, according to another embodiment of the present invention, the MME may be implemented to provide a sufficient paging area even if the UE does not perform cell update. In this case, the cell based area update may be permitted during the Attach/TAU procedure and the additional cell(s) in which the UE is movable during the interval of the idle mode may be provided to the MME together. That is, when the cell based area update is configured for the UE, the UE may additionally perform the TAU when the serving cell is changed. In order to prevent the TAU from being frequently performed, the MME may provide a list of cell(s) that are not required to trigger the TAU to the UE even though the cell is changed. In this case, the MME may derive the list of cell(s) based on a TAU result of the UE and provide the cell list to the UE in the Attach/TAU procedure. This will be described in more detail with reference to drawings given below.

FIG. 22 is a diagram exemplifying a method for determining a cell-based area update according to an embodiment of the present invention.

Referring to FIG. 22, the UE may indicate (transmit) the cell based area update capability to the MME during the Attach/TAU procedure (S2201).

For example, the UE may transmit the Attach Request message (NAS message) or TAU Request message (NAS message) indicating (or including) the cell based area update capability to the MME.

When the UE indicates the cell based area update capability, the MME may determine whether to allow the UE to update the cell based area (S2202).

Herein, the MME may determine whether to apply the cell based area update procedure to the corresponding UE based on the subscription information (e.g., the stationary/no mobility UE) of the corresponding UE and/or a load condition of a current paging resource (i.e., the paging resource of the radio section and the paging resource of the S1 section) (applicability).

For example, when the paging resources are sufficient, the MME may not need to accept the use of the cell based area update.

When the MME accepts the cell based area update procedure of the UE, the MME may instruct (transmit) the cell based area update acceptance to the UE during the Attach/TAU procedure (S2203).

For example, the UE may transmit the Attach Accept message (NAS message) or TAU Accept message (NAS message) indicating (or including) the cell based area update capability to the MME.

In this case, the MME may transmit the additional cell(s) to the UE in order to prevent the frequent TAU procedure from being performed due to the change of the serving cell. The MME may derive the additional cell(s) list based on the TAU result (e.g., tracking area information reported by the UE in the TAU procedure) of the UE.

The UE performs the cell based area update procedure (S2204).

That is, the UE may perform the TAU when the serving cell is changed.

When the MME provides the additional cell(s) list, the UE may determine whether to perform the TAU due to the cell change by using the additional cell(s). That is, when the UE is out of the serving cell and the additional cell(s) (i.e., the serving cell of the UE is changed and does not belong to the additional cell(s)), the UE may perform the TAU. On the contrary, when the UE moves within the serving cell and the additional cell(s), the UE may not perform the TAU.

Further, the MME may maintain the paging area comprised of the last known cell of the UE and the additional cell(s) provided to the UE. In addition, the MME may limit paging to the paging area for the UE. That is, the MME may transmit the paging to the corresponding UE only in the configured paging area.

In addition, the MME configures a cell based paging area in the UE, and detects the set cell based paging area when the UE frequently performs the TAU between neighboring cells to add the corresponding cell list to the Attach accept or TAU accept and transmit the corresponding cell list to the UE.

In this case, when the UE is instructed to update the cell based paging area and further, receives the additional cell, the UE performs the TAU to notify to the network that the serving cell is changed when the UE is out of the serving cell and the additional cell(s).

Meanwhile, the above-described cell based area update procedure may be implemented as one of the location area update (e.g., TAU or RAU) procedures. That is, the serving cell change (or the serving cell is changed to a cell other than the serving cell and the additional cell) in the triggering condition of the location area update may be included. In this case, when the UE is instructed to perform the cell based area update from the network, the location area update may be additionally performed even in the case where the cell is changed (or the serving cell is changed to the cell other than the 'serving cell and additional cell') in addition to the case where the location area (e.g., tracking area or routing area) configured to the UE is changed.

Further, the cell based area update procedure may be defined as a procedure separate from the location area update (TAU or RAU) procedure. In this case, when the UE is instructed to perform the cell based area update from the network, the UE may perform the location area update procedure in the case where the cell is changed (or the serving cell is changed to the cell other than the 'serving cell and additional cell'). In addition, the UE may perform the location area update (TAU or RAU) procedure when the location area (e.g., tracking area or routing area) configured to the UE is changed.

Further, when the cell based area update is applied, the UE does not perform the location area update procedure (e.g., tracking area/routing area update procedure) and may perform the cell based area update procedure.

In this case, the network does not need to operate the tracking area/routing area or drop the tracking area/routing area to the UE. When the periodic location area update timer of the UE expires, the UE may update reachability of the UE by performing the cell based area update procedure.

In addition, the UE and the network may perform the location update based on an agreed paging area according to the above-described embodiment. That is, when the UE is out of the cell belonging to the paging area, the UE may perform the cell based area update procedure.

In this case, information on the changed serving cell may be transmitted to the network. In addition, information including an additional cell (e.g., the overlapping cell and the cell in which the UE is expected to move in a short time) is included in the number (e.g., Max_Cell_N) set by the network to be transmitted to the network. When the network approves, the UE does not perform the cell based area update when moving within the reported cell list.

However, when the network accepts only a part of the cell list reported by the UE or the network adds the cell to transmit the cell list to the UE, the UE reflects all of the cell list to construct the paging area for performing the cell based area update.

Meanwhile, another embodiment of the present invention proposes a UE assisted paging area management method.

Currently, a key issue for paging optimization for the CIoT UE is being accepted and discussed as described below.

3GPP SA2 is discussing paging optimization issues due to scarce of radio interface resources and coder network interface resources associated with the no mobile/low mobility device. Therefore, it is discussed that the paging is transmitted only in the last used eNB/cell instead of transmitting the paging to all cells in the tracking area of the UE in order to reduce the paging resources for the radio interface and core network interface.

The issue of 'insufficient paging resources' is more serious for the CIoT due to the following reasons.

- The number of CIoT devices is larger than that of legacy cellular devices in a given area.
- Narrow band CIoT RAT (RAT) may not support the sufficient paging resources and UE identifiers (e.g., S-TMSI, IMSI, etc.) included in a single paging message may be significantly limited due to a small message size in contrast to a legacy access system (e.g., E-UTRAN).
- Because coverage enhancement is a necessary requirement, each paging message may be generated at a long period of time (i.e., repetition of the same paging message).

Most CIoT devices may have the no/low mobility characteristics. Therefore, limiting the paging area to the cell(s) rather than paging to all eNB(s)/cell(s) in the tracking area may be more suitable and beneficial in terms of reducing the paging resources.

However, the last known cell that informs the MME when the UE enters the idle mode may not be accurate in the case of the stationary CIoT device. The serving cell may be changed even though the UE does not move due to various reasons such as a change in radio load state and a change in surrounding state (i.e., blocking by a new building). Further, since the no mobility UE and the low mobility UE does not move in a wide range of areas, it may be advantageous to limit the paging area. Therefore, in paging optimization for the CIoT device, paging area management is required to limit the paging area to a smaller extent.

The following paging area management requirements may need to be met.

- The system needs to support an efficient paging area management procedure for the no/low mobility UE.
- The system needs to consider a change in dynamic environment radio state even in the case of the no mobility UE.
- The system needs to consider that the CIoT UE does not perform measurement reporting to the CIoT RAT.
- The system needs to consider frequent signaling exchanges.

As described above in the key issue, there is a need for an effective method for operating the paging area for the CIoT UE. In particular, in order to support the UE having the no mobility characteristic, a plurality of cells are included in the tracking area in the related art, whereas the tracking area may correspond to one cell in some cases in order to maintain the paging area in a narrow range.

The UE transmits the TAI request message including a last visited TAI in the TAU procedure to the core network and the core network transmits the TAU Accept message including a new TAI list centered on the received last visited TAI (TAU Accept) message to the UE.

In the case where the tracking area is configured narrowly for each cell and the core network does not manage the previous history or transmits only one TAI to the UE, when the UE is located at a cell border and moves two cells, there may be a problem in that the TAU frequently occurs.

As a result, another embodiment of the present invention proposes a method for more efficiently managing the paging area.

According to an embodiment of the present invention, the UE may transmit a TAC (Tracking Area Code) of the neighboring cell of the UE together at the time of transmitting the TAU request message. Therefore, the core network may generate a TAI list considering the TAC received from the UE and set the generated TAI list in the UE. As described above, by generating the TAI list considering the neighbor TAC, frequent TAU procedures of the UE may be prevented.

FIG. 23 is a diagram exemplifying a method for managing a paging area according to an embodiment of the present invention.

FIG. 23 exemplifies a case where the UE currently camps on eNB 3.

When the periodic TAU timer expires or the TAU is triggered by movement from another eNB to eNB 3, the UE performs the TAU procedure.

The UE transmits the TAU request message including the last visited TAI (TAI=3 in the case of FIG. 23) to the network.

The last visited TAI is used for the following purposes.

The last visited TAI is included in the TAU Request message to help the MME generate the TAI list for a subsequent TAU accept message.

'Selected network' indicates a selected network. 'Active flag' is a request by the UE for activation of a radio bearer and an S1 bearer for all activated EPS bearers by the TAU procedure when the UE is in the ECM-IDLE state. 'EPS bearer status' indicates each EPS bearer activated in the UE.

The TAU Request (TAU Request) message is integrity-protected by an NAS Message Authentication Code (NAS-MAC). An Evolved Key Set Identifier (eKSI), an NAS Sequence Number, and the NAS-MAC are included when the UE has valid EPS security parameters. The NAS sequence number indicates a sequence number of the NAS message. When the UE indicates a GUTI mapped from a Packet Temporary Mobile Identity (P-TMSI) in an 'old globally unique temporary identity (GUTI)' information element, a KSI may be included.

TABLE 4

| | |
|---|---|
| Last visited TAI | A TAI which is contained in the TA list the UE registered to the network and which identifies the tracking area last visited by the UE |

According to an embodiment of the present invention, the UE may transmit the neighbor TAI other than the last visited TAI to the network together at the time of transmitting the TAU request message. Further, in particular, in the case where the UE performs the periodic TAU, when the UE remains in the same tracking area, the UE may transmit the TAU request message not including the last visited TAI.

As illustrated in FIG. 23, the UE may confirm that the cell (i.e., a cell serviced by eNB 4) belonging to TAI: 3 but overlapped belongs to a different TAI (i.e., TAI: 4) from the serving cell. That is, by confirming the TAC/TAI broadcasted in the overlapped neighbor cells, the UE may confirm that the neighbor cell belongs to the TAI different from the TAI to which the neighbor cell belongs. In this case, the UE transmits the TAU request message including the last visited TAI (TAI=3) and the neighbor TAI (TAI=4) to the network.

When constructing (or transmitting) the TAI list in the TAU accept message, the network (e.g., MME) may construct the TAI list including the neighbor TAI reported by the UE.

FIG. 24 is a diagram exemplifying a method for managing a tracking area according to an embodiment of the present invention.

The UE transmits the TAU request message including the last visited TAI and the detected neighbor TAI to the network (S2401).

In the case where a movement possibility and a camping possibility of the UE to the neighbor cell are high (in the case where the network is allowed), when the UE detects that the corresponding cell belongs to another TAI, the UE transmits the TAU request including the corresponding TAI.

In this case, the TAU includes a case where the tracking area is changed and the TAU is triggered and a periodic TAU.

For example, in the case of the periodic TAU, when the UE belongs to the same cell or the same tracking area but a cell belonging to a new tracking area is found in the neighbor cell due to a change in radio state, the UE may transmit the TAU Request message including the detected neighbor TAI.

The TAU procedure proceeds (S2402). The TAU procedure not illustrated in FIG. 24 may be used similarly to the TAU procedure defined previously, and therefore, a detailed description thereof will be omitted.

The core network (e.g., MME) configures the TAI of the UE (S2403).

In this case, the core network (e.g., MME) may generate (configure) an optimal TAI list considering the camping cell and the last visited TAI of the UE and the additionally reported neighbor TAI.

The core network (e.g., MME) transmits the TAU accept message including the generated the TAI list to the UE (S2404).

By receiving the TAI list including the neighbor TAI belonging to the neighbor cell from the network, even when the UE moves to the corresponding neighbor cell, an additional TAU may not be triggered.

FIG. 25 is a diagram exemplifying a method for updating a location area according to an embodiment of the present invention.

Referring to FIG. 25, the UE transmits a first request message including a list of additional cells comprising one or more neighbor cells of the serving cell of the UE, to the network node (e.g., MME or SGSN) (S2501).

Herein, as described above, the first request message may correspond to the Attach/TAU request message or may correspond to the cell update request message.

The UE receives a first accept message including information indicating acceptance of use of the additional cell list from the network node (S2502).

Herein, as described above, the first accept message may correspond to the Attach/TAU accept message or may correspond to the cell update accept message.

In this case, the paging area of the UE may be comprised of the serving cell of the UE and the additional cell list.

When the changed serving cell of the UE belongs to the tracking area set in the UE and does not belong to the additional cell list, the UE performs the cell based area update procedure (S2503).

In this case, during the cell based area update procedure, the UE may transmit the additional cell list comprising one or more neighbor cells of the changed serving cell of the UE.

Meanwhile, before step S2501, the UE may transmit, to the network node, a second request message including information indicating a supportable capability of the cell based area update procedure.

Herein, as described above, the second request message may correspond to the Attach/TAU request message.

In addition, the UE may receive, from the network node, a second accept message including information indicating the acceptance of the cell based area update procedure.

Herein, as described above, the second accept message may correspond to the Attach/TAU accept message.

In this case, the paging area of the UE may comprised of the serving cell.

Further, the second accept message may include information on the maximum number of cells that can be included in the additional cell list and the number of cells belonging to the additional cell list transmitted to the network node by the UE may not exceed the maximum cell number.

In addition, in case that the second accept message includes an additional cell list determined by the network node, when the changed serving cell of the UE belongs to the tracking area configured to the UE and does not belong to the received additional cell list, the UE may perform the cell based area update procedure.

In this case, the paging area of the UE may be comprised of the serving cell of the UE and the received additional cell list.

Further, when the changed serving cell of the UE does not belong to the tracking area configured to the UE, the UE may perform the tracking area update procedure.

In this case, when the neighbor cell of the changed serving cell of the UE belongs to a tracking area different from the changed serving cell of the UE, the UE may transmit a first tracking area identifier to which the changed serving cell belongs and a second tracking area identifier to which the neighbor cell belongs to the network node during the tracking area update procedure.

In this case, the paging area of the UE may be comprised of the first tracking area identifier and the second tracking area identifier.

Overview of Devices to which the Present Invention can be Applied

FIG. 26 illustrates a block diagram of a communication device according to one embodiment of the present invention.

With reference to FIG. 26, a wireless communication system comprises a network node 2610 and a plurality of UEs 2620.

A network node 2610 comprises a processor 2611, memory 2612, and communication module 2613. The processor 2611 implements proposed functions, processes and/or methods proposed through FIG. 1 to FIG. 25. The processor 2611 can implement layers of wired/wireless interface protocol. The memory 2612, being connected to the processor 2611, stores various types of information for driving the processor 2611. The communication module 2613, being connected to the processor 2611, transmits and/or receives wired/wireless signals. Examples of the network node 2610 include an eNB, MME, HSS, SGW, PGW, application server and so on. In particular, in case the network node 2610 is an eNB, the communication module 2613 can include a Radio Frequency (RF) unit for transmitting/receiving a radio signal.

The UE 2620 comprises a processor 2621, memory 2622, and communication module (or RF unit) 2623. The processor 2621 implements proposed functions, processes and/or methods proposed through FIG. 1 to FIG. 25. The processor 2621 can implement layers of wired/wireless interface protocol. The memory 2622, being connected to the processor 2621, stores various types of information for driving the processor 2621. The communication module 2623, being connected to the processor 2621, transmits and/or receives wired/wireless signals.

The memory 2612, 2622 can be installed inside or outside the processor 2611, 2621 and can be connected to the processor 2611, 2621 through various well-known means. Also, the network node 2610 (in the case of an eNB) and/or the UE 2620 can have a single antenna or multiple antennas.

FIG. 27 illustrates a block diagram of a wireless communication apparatus according to an embodiment of the present invention.

Particularly, in FIG. 27, the UE described above FIG. 26 will be exemplified in more detail.

Referring to FIG. 27, the UE includes a processor (or digital signal processor) 2710, RF module (RF unit) 2735, power management module 2705, antenna 2740, battery 2755, display 2715, keypad 2720, memory 2730, Subscriber Identification Module (SIM) card 2725 (which may be optional), speaker 2745 and microphone 2750. The UE may include a single antenna or multiple antennas.

The processor 2710 may be configured to implement the functions, procedures and/or methods proposed by the present invention as described in FIG. 1-25. Layers of a wireless interface protocol may be implemented by the processor 2710.

The memory 2730 is connected to the processor 2710 and stores information related to operations of the processor 2710. The memory 2730 may be located inside or outside the processor 2710 and may be connected to the processors 2710 through various well-known means.

A user enters instructional information, such as a telephone number, for example, by pushing the buttons of a keypad 2720 or by voice activation using the microphone 2750. The microprocessor 2710 receives and processes the instructional information to perform the appropriate function, such as to dial the telephone number. Operational data may be retrieved from the SIM card 2725 or the memory module 2730 to perform the function. Furthermore, the processor 2710 may display the instructional and operational information on the display 2715 for the user's reference and convenience.

The RF module 2735 is connected to the processor 2710, transmits and/or receives an RF signal. The processor 2710 issues instructional information to the RF module 2735, to initiate communication, for example, transmits radio signals comprising voice communication data. The RF module 2735 comprises a receiver and a transmitter to receive and transmit radio signals. An antenna 2740 facilitates the transmission and reception of radio signals. Upon receiving radio signals, the RF module 2735 may forward and convert the signals to baseband frequency for processing by the processor 2710. The processed signals would be transformed into audible or readable information outputted via the speaker 2745.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

In a wireless communication system of the present invention, an example in which a location area updating method and/or a paging area setting method are/is applied to a 3GPP LTE/LTE-A system is primarily described, but can be applied to various wireless communication systems in addition to the 3GPP LTE/LTE-A system.

The invention claimed is:

1. A method for performing, by a terminal, location area update in a wireless communication system, the method comprising:
    transmitting, to a network node, a second request message including information indicating a compatibility of the cell based area update procedure;
    receiving, from the network node, a second accept message including information indicating an acceptance of the cell based area update procedure;

transmitting, to the network node, a first request message including an additional cell list comprising one or more neighboring cells of a serving cell of the terminal;

receiving, from the network node, a first accept message including information indicating an acceptance of the additional cell list; and performing a cell based area update procedure when a changed serving cell of the terminal belongs to a tracking area configured for the terminal and does not belong to the additional cell list.

2. The method of claim 1, wherein while the cell based area update procedure is performed, the additional cell list comprising one or more neighboring cells of the changed serving cell of the terminal is transmitted to the network node.

3. The method of claim 1, wherein after the first accept message is received, a paging area of the terminal is comprised of the serving cell of the terminal and the additional cell list.

4. The method of claim 1, wherein after the second accept message is received, a paging area of the terminal is comprised of the serving cell of the terminal.

5. The method of claim 1, wherein the second accept message includes information on a maximum number of cells which can be included in the additional cell list, and
includes information on a number of cells belonging to the additional cell list not exceeding the maximum cell number.

6. The method claim 5, wherein after the second accept message is received, the paging area of the terminal constitutes the serving cell of the terminal and the received additional cell list.

7. The method of claim 1, wherein when the second accept message includes another additional cell list determined by the network node, and when the changed serving cell of the terminal belongs to a tracking area configured to the terminal but does not belong to the received additional cell list, performing the cell based area update procedure.

8. The method of claim 1, further comprising:
performing a tracking area update procedure when the changed serving cell of a user equipment (UE) does not belong to the tracking area configured for the terminal.

9. The method of claim 8, wherein when the neighboring cell of the changed serving cell of the terminal belongs to a tracking area different from the changed serving cell of the terminal,
a first tracking area identifier, associated with the changed serving cell, and a second tracking area identifier, associated with the neighbor cell, are transmitted to the network node during the tracking area update procedure.

10. The method of claim 9, wherein after the tracking area update procedure is completed, the paging area of the terminal is comprised of the first tracking area identifier and the second tracking area identifier.

11. A terminal for performing location area update in a wireless communication system, the terminal comprising:
a transceiver; and
a processor, operatively coupled to the transceiver,
wherein the processor is configured to:
transmit, to a network node, a second request message including information indicating a compatibility of the cell based area update procedure,
receive, from the network node, a second accept message including information indicating an acceptance of the cell based area update procedure,
transmit, to the network node, a first request message including an additional cell list comprising one or more neighboring cells of a serving cell of the terminal,
receive, from the network node, a first accept message including information indicating an acceptance of the additional cell list, and
perform a cell based area update procedure when a changed serving cell of the terminal belongs to a tracking area configured for the terminal and does not belong to the additional cell list.

* * * * *